(12) United States Patent
Davis et al.

(10) Patent No.: US 7,471,009 B2
(45) Date of Patent: Dec. 30, 2008

(54) UNDERWATER DUCTED TURBINE

(75) Inventors: Barry V. Davis, deceased, late of Bedford (CA); by Lena Marie Davis, legal representative, Bedford (CA); Emmanuel Grillos, Bellevue, WA (US); Stephen Allison, North Vancouver (CA)

(73) Assignee: Clean Current Power Systems Inc., Vancouver, B.C. (CA)

( * ) Notice: Subject to any disclaimer, the term of this patent is extended or adjusted under 35 U.S.C. 154(b) by 0 days.

(21) Appl. No.: 10/489,642

(22) PCT Filed: Sep. 16, 2002

(86) PCT No.: PCT/CA02/01413

§ 371 (c)(1),
(2), (4) Date: Aug. 25, 2005

(87) PCT Pub. No.: WO03/025385

PCT Pub. Date: Mar. 27, 2003

(65) Prior Publication Data

US 2005/0285407 A1    Dec. 29, 2005

Related U.S. Application Data

(60) Provisional application No. 60/322,443, filed on Sep. 17, 2001.

(51) Int. Cl.
*F03B 13/00* (2006.01)
*F03B 13/10* (2006.01)
*H02P 9/04* (2006.01)

(52) U.S. Cl. .......................................... 290/54; 290/43

(58) Field of Classification Search .................... 290/42, 290/43, 54, 53, 55; 415/7; 60/496, 497
See application file for complete search history.

(56) References Cited

U.S. PATENT DOCUMENTS 654,654 A * 7/1900 Lawrence .................... 415/68

(Continued)

FOREIGN PATENT DOCUMENTS

CH             684430         9/1994

(Continued)

OTHER PUBLICATIONS

Curran and Gato, "The energy conversion performance of several types of Wells turbine designs", Proc. Inst. Mech. Engrs. vol. 211 Part A (1997).

(Continued)

*Primary Examiner*—Julio Gonzalez
(74) *Attorney, Agent, or Firm*—Michael R. Schacht; Schacht Law Office, Inc.

(57) ABSTRACT

An apparatus is disclosed for a turbine for generating electrical power from water or air flow comprising at least one rotor disk having a plurality of hydrofoil blades, a guide vanes, a cylindrical housing, and a generator means. A rim generator comprising a magnet race rotor rim and fixed stator coils in the housing is used. The apparatus is fitted with a screen to stop the ingress of debris and marine life, and a skirt augmenter device to reduce the Betz effect. The apparatus is preferably for sub-sea deployment and driven by tidal currents, but may be powered by river current or wave driven air or by wind. The apparatus may be deployed on at least one telescoping pole, tethered to the sea-bed and kept buoyant by buoyant concrete in the housing, inserted in a dam, under a barge or in a tidal power array.

39 Claims, 25 Drawing Sheets

U.S. PATENT DOCUMENTS

| | | | |
|---|---|---|---|
| 1,123,491 A * | 1/1915 | Corbin | 290/54 |
| 1,326,730 A | 12/1919 | Helguera | |
| 1,486,186 A | 3/1924 | Gulbransen | |
| 1,493,154 A | 5/1924 | Harza | |
| 1,835,018 A | 12/1931 | Darrieus | |
| 2,471,892 A * | 5/1949 | Price | 60/268 |
| 2,501,696 A * | 3/1950 | Souczek | 290/43 |
| 2,509,442 A | 5/1950 | Matheisel | |
| 2,652,505 A | 9/1953 | Matheisel | |
| 2,782,321 A * | 2/1957 | Fischer | 290/4 R |
| 3,323,592 A * | 6/1967 | Brandon | 166/249 |
| 3,504,990 A * | 4/1970 | Sugden | 416/176 |
| 3,740,565 A | 6/1973 | Wesley | |
| 3,980,894 A * | 9/1976 | Vary et al. | 290/54 |
| 3,986,787 A * | 10/1976 | Mouton et al. | 415/7 |
| 4,025,220 A * | 5/1977 | Thompson et al. | 415/7 |
| 4,095,918 A | 6/1978 | Mouton, Jr. et al. | |
| 4,140,433 A * | 2/1979 | Eckel | 415/209.1 |
| 4,159,188 A | 6/1979 | Atencio | |
| 4,163,904 A | 8/1979 | Skendrovic | |
| 4,166,596 A | 9/1979 | Mouton, Jr. et al. | |
| 4,219,303 A | 8/1980 | Mouton | |
| 4,221,538 A | 9/1980 | Wells | |
| 4,313,711 A | 2/1982 | Lee | |
| 4,324,985 A | 4/1982 | Oman | |
| 4,367,413 A * | 1/1983 | Nair | 290/52 |
| 4,368,392 A | 1/1983 | Drees | |
| 4,385,492 A | 5/1983 | Lee | |
| 4,417,446 A | 11/1983 | Nakamoto et al. | |
| 4,421,990 A | 12/1983 | Heuss et al. | |
| 4,468,153 A | 8/1984 | Gutierrez Atencio | |
| 4,476,396 A | 10/1984 | Calvert, Jr. | |
| 4,524,285 A * | 6/1985 | Rauch | 290/43 |
| 4,593,527 A | 6/1986 | Nakamoto et al. | |
| 4,648,788 A | 3/1987 | Jochum | |
| 4,720,640 A * | 1/1988 | Anderson et al. | 290/43 |
| 4,755,690 A | 7/1988 | Obermeyer | |
| 4,781,522 A * | 11/1988 | Wolfram | 415/1 |
| 5,228,800 A | 7/1993 | Akai | |
| 5,592,816 A | 1/1997 | Williams | |
| 5,825,094 A * | 10/1998 | Hess | 290/54 |
| 6,146,096 A | 11/2000 | Winkler | |
| 6,168,373 B1 | 1/2001 | Vauthier | |
| 6,281,597 B1 | 8/2001 | Obermeyer | |
| 6,285,090 B1 | 9/2001 | Brutsaert et al. | |
| 6,406,251 B1 | 6/2002 | Vauthier | |
| 6,476,513 B1 * | 11/2002 | Gueorguiev | 290/55 |
| 6,648,589 B2 | 11/2003 | Williams | |
| 6,836,028 B2 | 12/2004 | Northrup et al. | |

| 2002/0088222 A1 | 7/2002 | Vauthier |
|---|---|---|

FOREIGN PATENT DOCUMENTS

| | | |
|---|---|---|
| CN | 85201823 | 3/1986 |
| DE | 1028948 | 4/1958 |
| EP | 0045202 | 2/1982 |
| FR | 26223 | 9/1923 |
| FR | 866053 | 6/1941 |
| FR | 891697 | 3/1944 |
| FR | 56102 | 9/1952 |
| FR | 2527803 | 12/1983 |
| FR | 2660701 | 10/1991 |
| GB | 2348250 | 9/2000 |
| JP | S50-094339 | 7/1975 |
| JP | S55-5402 | 1/1980 |
| JP | 55072665 A * | 5/1980 |
| JP | S55-072665 | 5/1980 |
| JP | 56077565 A * | 6/1981 |
| JP | S61-192859 | 8/1986 |
| JP | S62-38876 | 2/1987 |
| JP | S62-71381 U | 5/1987 |
| JP | H03-222869 | 10/1991 |
| JP | H06-87671 | 12/1994 |
| JP | H08-338354 | 12/1996 |
| JP | H10-115278 | 5/1998 |
| JP | 2000-213446 | 8/2000 |
| JP | 2000-240552 | 9/2000 |
| NL | 9400050 | 8/1995 |
| NL | 1012489 | 11/2000 |
| WO | WO 00/28210 | 5/2000 |
| WO | WO 00/50769 | 8/2000 |
| WO | WO 00/55440 | 9/2000 |
| WO | WO 01/06122 A1 | 1/2001 |
| WO | WO 01/25627 | 4/2001 |

OTHER PUBLICATIONS

Davis, Barry V. (1997) Nova Energy Ltd. "A Major Source of Energy From the World's Oceans" IECEC-97 Conference, Jul. 31, 1997, Honolulu.

Davis, Barry V. (1980) Nova Energy Ltd. "Water Turbine Model Trials" Report No. NEL 002.

Phillips, D.G. et al., Diffuser Development for a Diffuser Augmented Wind Turbine using Computational Fluid Dynamics, 2000, pp. 1-10, University of Auckland, New Zealand.

Dixon, S.L., Fluid Dynamics, Thermodynamics of Turbomachinery, 4th ed., 1996, University of Liverpool, pp. 124-133.

Vortec Energy, Information Memorandum, Nov. 20, 2001, pp. 1-15, Vortec Energy, New Zealand.

Kirke, Brian, Developments in ducted water current turbines, Tidal Paper, Aug. 16, 2003, pp. 1-12, School of Engineering, Griffith University, Australia.

* cited by examiner

UNDERWATER DUCTED TURBINE

1. TECHNICAL FIELD

The present invention relates generally to hydrokinetic electrical power generating turbines and methods of use and deployment. More specifically, a ducted rim type generator, bi-directional turbine for generating power from tidal currents in various deployments is disclosed.

2. BACKGROUND OF THE INVENTION

Tidal power has been harnessed for many centuries. Tidal grain mills have been located on coastal inlets where seawater could be trapped by sluice gates in low dams at high tide, to be released through a mill wheel at low tide. Such mill wheels are examples of rudimentary hydraulic turbines.

Energy shortages have spurred research activity, including the construction of significant pilot projects in the area of tidal power generation using more modern turbine designs, in Normandy, France and Nova Scotia, Canada. The Normandy and Nova Scotia projects required significant infrastructure and damning of tidal estuaries. The effect of all such projects on the ocean inlet and estuaries is to interfere with tidal dynamics and disrupt marine biological ecosystems in the inter-tidal zones behind the dam.

While the pilot projects in Normandy and Nova Scotia are still in operation, they have not proven to be economical, and with the global rise in environmental consciousness, this approach has fallen into disfavor. More recent work has been focused on 'free-stream' machines that are less costly and far less disruptive to tidal dynamics and the affected marine ecosystems. 'Arrays' of such units would consist of single or multiple rows of free-stream machines deployed transversely and/or linearly in an ocean inlet or passage in the manner of a wind-farm. Indeed the term 'turbine-farm' has been used to describe such deployment.

In the 1920s, U.S. Pat. No. 1,493,154 to Harza disclosed a substantially horizontal axis water turbine for use in the draft tube of a low head dam, wherein the stator coils surrounded the runner or rim housing the turbine blades. Harza proposed water seals between the runner and stator. It is very difficult to maintain the integrity of water seal in a hydraulic turbine, as underwater turbines are subject to high levels of vibration, erosion and torsion due to the density and velocity of the water.

U.S. Pat. No. 3,986,787 to Mouton disclosed a uni-directional hydraulic turbine with angled blades also including a longitudinal twist. The Mouton patent teaches a deployment method of mounting the turbines under a barge in a river, with a generator on top of the barge. The Mouton patent also discloses a trash screen in front of the turbine consisting of a conical array of cables. The Mouton patent, as with most conventional hydraulic turbines, uses a hub based generator system with impact type blades which are angled with respect to the direction of the water flow. The trash screen of the Mouton patent protected only one end of the turbine and was not self-cleaning, requiring constant regular maintenance.

U.S. Pat. No. 4,163,904 to Skendrovic disclosed an understream turbine plant requiring substantial infrastructure and sealing about the single unidirectional turbine with hub generator.

Investigation into harnessing wave motion resulted in U.S. Pat. No. 4,221,538 to Wells, disclosing a uni-directional aerofoil turbine powered by the air forced through the turbine by the oscillating water column created by wave action enclosed in a floating chamber. The Wells patent disclosed a single rotor with a hub-based generator.

In the 1980's Heuss and Miller disclosed a tidal power plant in U.S. Pat. No. 4,421,990 with a fixed concrete barrage of unidirectional impact turbines with angled blades and a rim-based generator. The Heuss patent required substantial infrastructure, including a dam, draft tube and generator housing. The stator was housed in the dam or foundation at the outer rim of the runner wheel housing the turbine blades and required watertight seals.

U.S. Pat. No. 4,313,711 to Lee disclosed fixed stator blades or vanes that deflected the flow of air or water onto multiple Wells type aerofoil cross-section blades to cause efficient rotation. The Lee patent uses wave motion or wave driven air to generate power. The guide vanes are fixed and the rotors rotate at the same speed and in the same direction.

In the 1990's, Curran, and Gato ran trials on a series of different Wells type air turbines and published their results in the article: "The energy conversion performance of several types of Wells turbine designs", Proc. Inst. Mech. Engrs. Vol 211 Part A (1997). The trials included single rotor devices with and without guide vanes, and dual rotor devices with the rotors rotating in the same direction and counter-rotating. Although Curran and Gato did not investigate the effect of dual counter rotating rotors with guide vanes, they concluded that two rotors are more efficient than one, that counter-rotating rotors provided a higher damping ratio and improved post-stall performance than uni-directional pairs, and that inlet and outlet guide vanes provided reduced tangential kinetic energy losses compared to those units without vanes.

The following papers are also of interest regarding a vertical axis turbine and a feasibility study on sub-sea power generation from tidal currents:

Davis, Barry V. (1997) Nova Energy Ltd. "A Major Source of Energy From the Worlds Oceans" IECEC-97 Conference, Jul. 31, 1997, Honolulu.

Davis, Barry V. (1980). Nova Energy Ltd. "Hydraulic Turbine Trials" Report No. NEL 002. DSS Contract No. OSX-00043.

Vauthier, in U.S. Pat. Nos. 6,168,373B1, 6,406,251, and 2002/0088222A1 disclosed a floating, uni-directional and bi-directional lightweight dual ducted turbine hub-generator unit suitable for either tidal or river deployment. The dual, side by side rotationally uni-directional, turbine swings freely with the water current. The turbine therefore must swing to the direction of the current as it accepts only uni-directinal water flow. The bi-directional unit is moored at both ends and thereby kept in the line of current regardless of the direction of water flow. Additional features include stabilizer fins on the housing, and an augmentor ring at the downstream end of the housing to deflect external water flow thereby creating a venturi effect at the outfall of the housing and presumably accelerating the flow of water through the turbine. The turbine blades are of the angled, conventional type and guide vanes are not used.

In the fall of 2001 Vortec Energy Limited of New Zealand published an "Information Memorandum" disclosing a wind turbine using a diffuser ring to create a low-pressure region downstream of the turbine rotor. The preferred embodiment of the Vortec unit is a huge 50 m diameter and greater wind turbine deployed either on or offshore. Barge, pole and block mounted sub-sea units were contemplated, but not developed. The Vortec Memorandum also suggests the possibility of rim generation to eliminate the need for large center body structures and hub mechanisms. In PCT Publication WO 01/06122 A1 to Fox et. al, owned by Vortec, advantages of a slotted, aerofoil cross section blade in a turbine are disclosed.

The current technology for hydro turbines is unsatisfactory due to the large number of moving parts and complexity of manufacturing, installing and maintaining turbines in the corrosive salt water environment.

There is a need therefore for an efficient hydraulic turbine generator unit, which can harness tidal energy with a minimal environmental impact. A turbine with a minimum number of moving parts which optimizes energy conservation by minimizing friction and flow losses, and can be manufactured, installed and maintained without substantial infrastructure costs is required, and a simple generator free of moving parts such that maintenance requirements are minimized. The present invention provides a ducted, flooded rim generator, bi-directional turbine having two or more coaxial counter rotating rotors with augmenter skirt that overcomes the disadvantages of the prior art.

3. SUMMARY OF THE INVENTION

It is an object of the present invention to implement an apparatus for a hydro turbine generator that overcomes some of the disadvantages of the prior art.

Other objects include providing an apparatus with a hub parallel to the water flow, a plurality of blades, a cylindrical housing and a plurality of guide vanes which are curved and rectangular and redirect the water flow to strike the blades at an optimal angle. The blades may be symmetrical hydrofoils in cross section.

The vanes may be fixed or they may flip between a first and second position, the first position being appropriate for redirecting an inflow and the second position appropriate for redirecting an outflow to minimize downstream efficiency losses.

Another object of the present invention is to provide a bi-directional turbine with dual counter-rotating rotor disks to create a stable, efficient turbine generator unit minimizing swirl losses.

Another object of the present invention is to provide a screen to prevent the ingress of marine life and debris into the turbine unit.

Another object of the present invention is to provide a longitudinal hole in the hub that water can flow through.

A further object of the present invention is to provide an augmentor skirt which minimizes the Betz effect, and is adapted to rotate the guide vanes when the water flow changes direction due to the tide change.

It is a further object of the present invention to provide a rim generating hydro turbine where the generator is flooded with ambient fluid.

Yet a further object of the present invention is to provide a turbine generator with a modular removable unit including the rotor disk to facilitate ease of maintenance.

Yet a further object of the present invention is to provide a hydro turbine generator which may be deployed individually or in any number of units, and be deployed on pylons, under a raft, tethered to the marine floor and floating due to an integral buoyant structure, in a dam, by a river, or in a tidal array crossing a submarine dip, depression or valley.

Further advantages of the invention will become apparent when considering the drawings in conjunction with the detailed description.

4. BRIEF DESCRIPTION OF THE DRAWINGS

The apparatus and method of the present invention will now be described with reference to the accompanying drawing figures, in which.

5. DETAILED DESCRIPTION OF THE INVENTION

Figure 1:
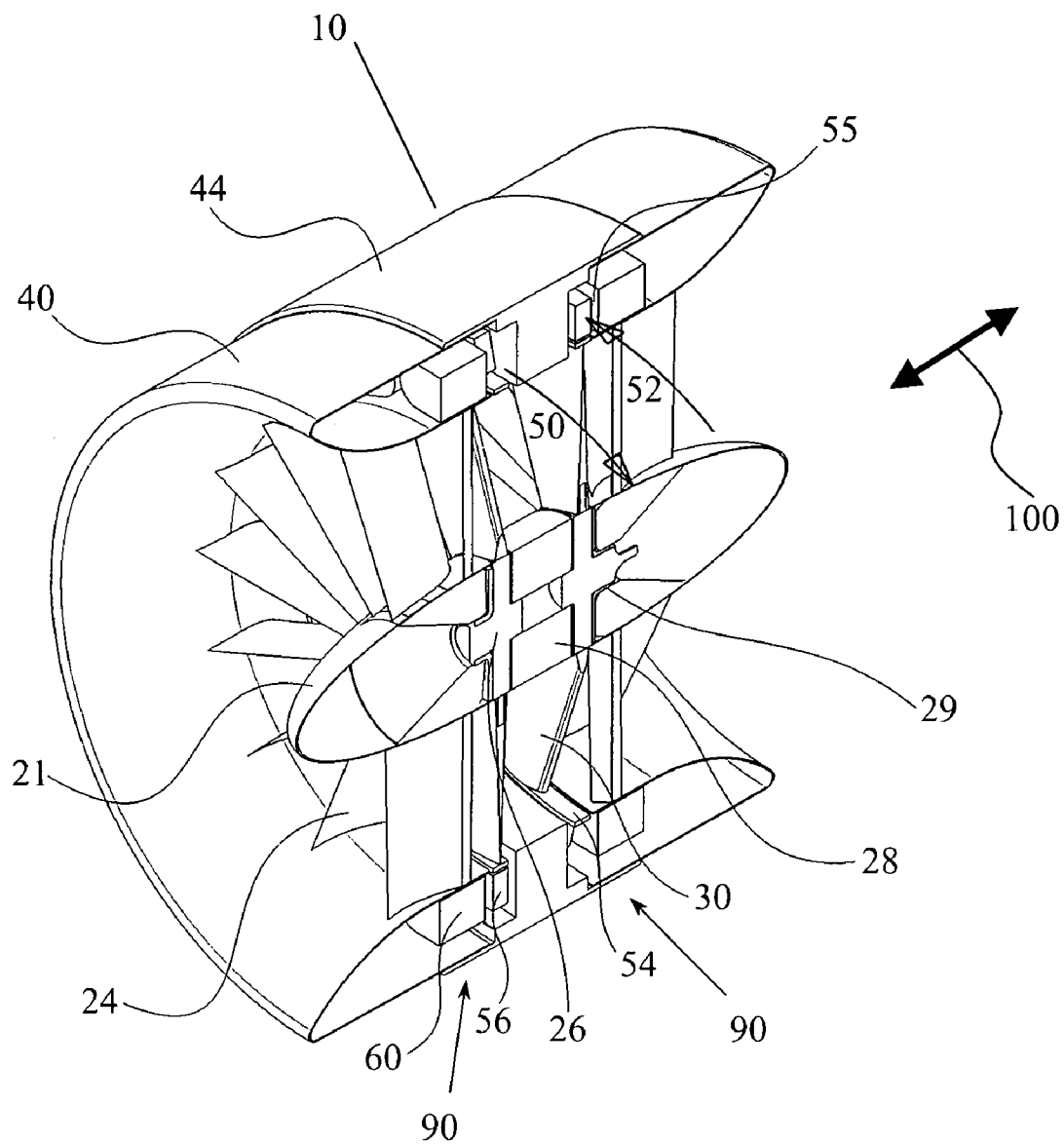
FIG. 1 is a cut away perspective view of a dual inline set of counter-rotating rotor disks with a housing and guide vanes according to the invention.

Referring to FIG. 1, a cut-away view of the preferred embodiment of the invention is shown. The modular ducted turbine generator unit 10 may be used as a single turbine generator unit 10 or with a plurality of turbine generator units 10, typically deployed in sub-sea tidal areas, although the design may be used in other environments such as rivers, tail-races or wind energy units. The purpose of the turbine generator unit 10 is to efficiently generate electrical power using tidal forces with minimal environmental impact. The preferred embodiment is intended for sub-sea deployment. It will be apparent that the present invention provides an efficient power generator unit with minimal moving parts.

The turbine generator unit 10 has two ends about a center line which are symmetrical. A hub 20 with an axis substantially parallel to the direction of water flow 100 is disposed along the central axis of the turbine generator 10. The hub 20 has a hub nose 21 at each end which may be advantageously formed in any hydrodynamic shape. The hub nose 21 may be ogive shaped or have ogive shaped caps in order to minimize drag into and out of the duct 40.

A plurality of hydrofoil blades 30 with symmetric cross sections are attached at their root to a central hub 26 and at their periphery or tip to a permanent magnet race also called a rotor rim 54 and together comprise a rotor disk 50. In the preferred embodiment there is a first rotor disk 50 and a second rotor disk 52 mounted coaxially in a front and back configuration. The rotor disks 50 and 52 will only rotate in one direction due to the hydrofoil shape of the blade 30. Thrust bearings 29 rotate freely between and abut against the central hub 26 for each rotor disk 50 and 52 and the hub nose 21. Bearings are preferably water lubricated low friction thrust bearings 29. A central hub or bearing-spacer 28 seats rotatably and coaxially between the central hub 26 of the two rotor disks 50 and 52 and separates the rotor disks 50 and 52 from any contact with each other. The rotor disks 50 and 52 rotate freely about the spacer 28.

The upstream rotor disk 50 when viewed form the direction of the water flow 100 will always rotate one direction (either clockwise or counter-clockwise), and the downstream rotor 52 will always rotate in the opposite direction. When the tide and therefore water flow 100 direction reverses, the second rotor 52 will now be upstream, and will continue to rotate in the same direction as before due to the hydrofoil shape. Thus the turbine generator unit 10 is bi-directional with regard to the water flow 100, and each rotor disk 50 and 52 always rotates in the same direction. When the turbine generator unit 10 has a single rotor disk 50, it also rotates in a single direction.

The blades 30 are symmetrical airfoils or hydrofoils projecting radially at substantially 90 degrees from the hub 26. The blades 30 have a top and bottom surface and a leading edge and trailing edge. The top and bottom surface of the blades 30 is generally perpendicular to the water flow 100. The blades 30 may be disposed at an oblique angle, such as for a swept-back blade configuration. The number of blades 30 is dependent on the size of the turbine. Any airfoil and/or hydrofoil shape known to the art which creates a variation of the speed of the fluid flowing across the respective sides of the blades 30 thereby creating optimal lift and drag may be used.

The duct 40 is a hollow cylinder disposed about the axis of the rotor 50 to form a duct and house the rotor 50. The duct 40 may be a cylinder of constant internal diameter, or the interior walls may converge in order to increase the velocity of water flowing through the duct 40. In the preferred embodiment the interior walls of the duct 40 converge in the central portion thereby producing a venturi effect as the water flow 100 passes through the duct 40. The rotor rim 54 allows for a plurality of hermetically sealed permanent magnets 56 attached to the outer rim of the rotor disks 50 and 52. The rotor disk rim permanent magnet race sits in a recess in the outer duct 40, which houses the hermetically sealed stator coils 60. The second rotor 52 rotates in a direction opposite to the first rotor 50, in order to decrease fluid momentum losses due to swirl and therefore render the turbine generator unit 10 more efficient. Fixed stator coils 60 are mounted in the duct 40 adjacent to the outer edge of the rotor disks 50 housing the magnets 56.

Optionally, to operate concentrically and resist lateral loads, a magnetic bearing system may be used at the rotor rim 54, which is known in the art. The rotor rim 54 seats rotably in a magnet race or rotor rim cavity 55 in the duct 40, water lubricated low friction skid plates (not shown) may be mounted on the exterior sides of the rotor rim 54 to protect the stator coils 60 against excessive deflection by the rotor disk 50 and 52

A plurality of curved, generally rectangular guide vanes 24, acting also as hub supports, extend from the hub 20 to the rotor housing or duct 40 to form a stable shaft on which the rotor disks 50 and 52 rotate. The guide vanes 24 have a generally sharp leading edge, a sharp trailing edge and two sides. The guide vanes 24 provide an initial angle of attack to the upstream rotor disk 50, and exit guide vanes 24 aft of the downstream rotor disk 52, to minimize hydrodynamic swirl momentum losses. In the preferred embodiment the face of the guide vanes is curved in an arc such that water striking the vanes 24 is redirected at a predetermined angle of attack, before striking the blades 30. The blades 30 have zero angle of attack with respect to the rotor disk 50, and have a symmetric cross-section.

The turbine generator unit 10 remains fixed in place, and as the tide and therefore water flow 100 reverses, the rotors begin to rotate in their respective directions. The arrangement of the counter-rotating rotor disks 50 and 52 and the guide vanes 24 provides high-efficiency power output with the flow 100 coming into the duct(s) 40 from either direction of the rotor-disk axis and minimized the number of moving mechanical parts, thereby reducing costly maintenance in the marine environment.

Figure 2:
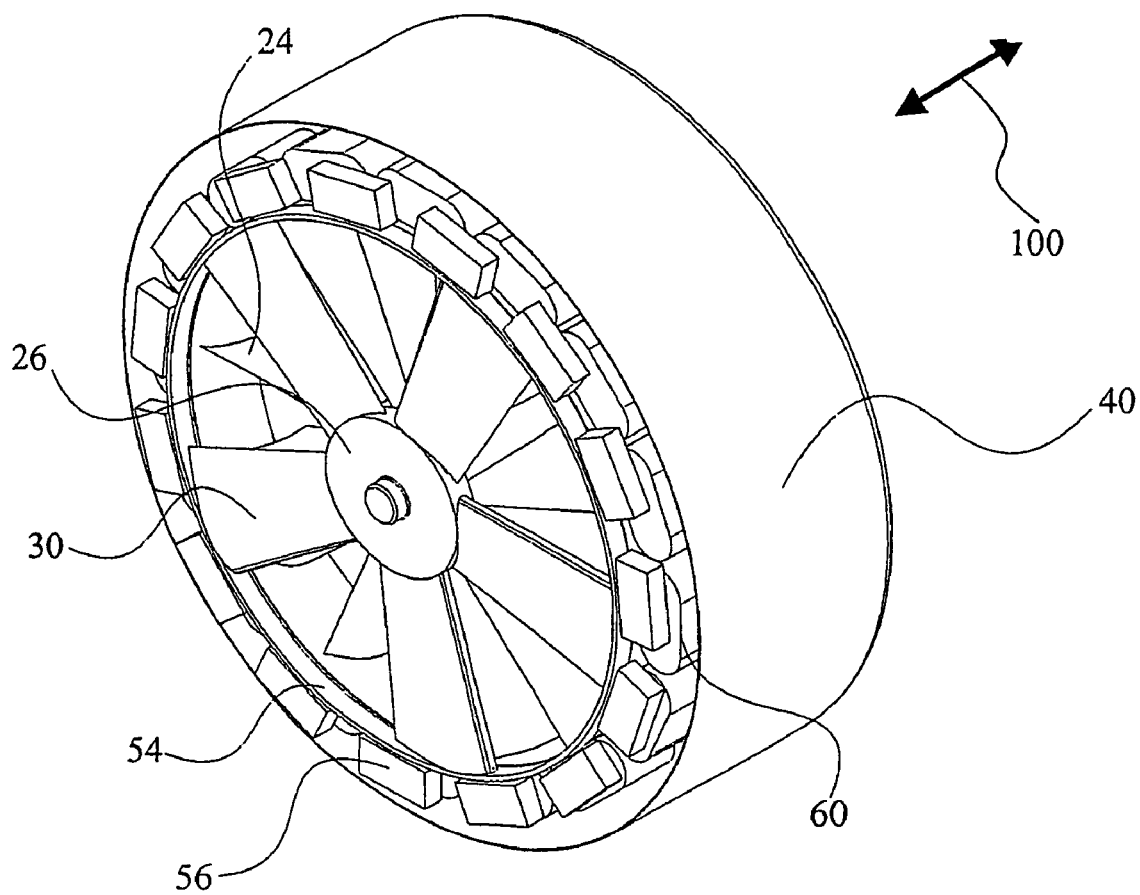
FIG. 2 is an isometric view of one half of a turbine comprising a single rotor disk and generator, duct and guide vanes according to the invention.

Referring now to FIG. 2, in a detail view with half of the turbine assembly removed, the rotor disk hub 26, blades 30, permanent magnet rotor rim 54, permanent magnets 56, stator coils 60, guide vanes 24 and duct 40 section, are shown.

Rotor disk torque is created by the flow of water 100 into the duct 40, given an initial angle of attack by the guide vanes 24 which creates lift across the blades 30 thereby commencing rotation of the first rotor 50. The water flow 100 is swirling with a beneficial angle of attack as it departs the first rotor 50 and strikes the second rotor 52, thereby rotating the second rotor 52 (see FIG. 1] in the opposite direction to the first rotor 50. As the magnets 56 in the rotor disk rim 54 pass the fixed stators 60 in the duct 40, as is well known in the art according to Faraday's law, a voltage is induced equal to the number of turns in the stator coil multiplied by the rate of change in the flux. The electrical current may then be removed by electrical cable (not shown) by any means known to the art. The generator, comprising the rotor 50, magnets 56 and stators 60 can be wired to produce direct current or three phase alternating current as is well known in the art. The space between the magnets 56 and stators 60 is flooded with the ambient working fluid, thereby avoiding the costly and impractical use of air seals, which typically fail or require high maintenance in underwater applications due to the high hydrodynamic loads being exerted on the turbine generator unit.

Figure 3:
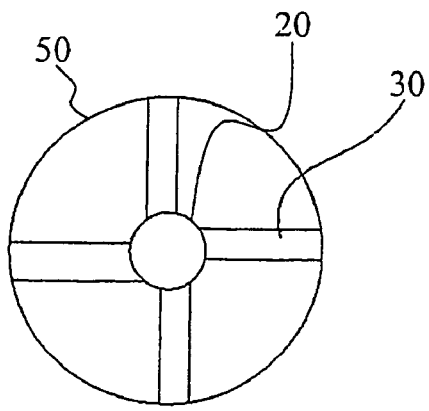
FIG. 3 is an elevation view of a turbine rotor, blade and rim assembly with blades swept in a curve to the tip.

FIG. 3 is an elevation view of a rotor disk 50 having straight blades 30 of constant chord dimension, or length from the root to the tip. The blades 30 are arranged with the quarter chord aligned with the hub 20 axis. All blades 30 are symmetric hydrofoils in cross section. The blades 30 may be from two to n in plurality.

Figure 4:
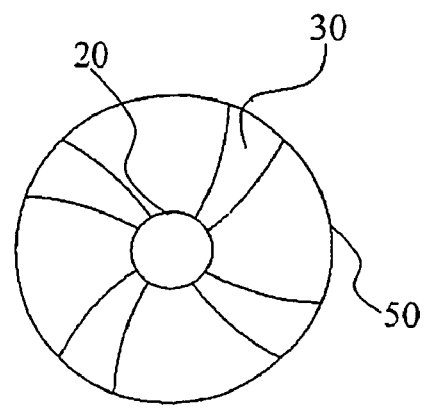
FIG. 4 is an elevation view of a turbine rotor, blade and rim assembly with wide tipped blades according to the invention.

FIG. 4 is an elevation view of a rotor disk 50 having curved blades 30 narrow at the hub and wide at the tips. Optionally, curved blades 30 wide at the hub 20 having narrow tips may be used (not shown). All blades 30 are symmetric hydrofoils in cross section. The direction of sweep of the blades 30 is aft or towards the center of the turbine generator unit hub 20, but a forward sweep is also an option. The blades 30 may be from two to n in plurality.

Figure 5:
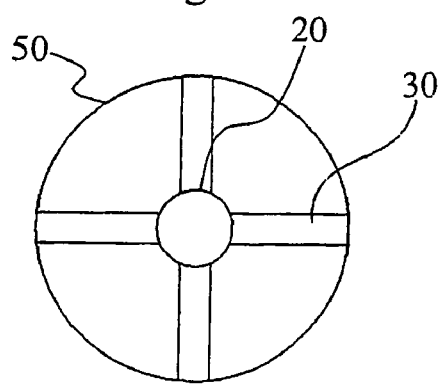
FIG. 5 is an elevation view of a turbine rotor, blade and rim assembly with perpendicular offset blades according to the invention.

FIG. 5 is an elevation view of a turbine rotor disk 50, blade 30 and rotor rim 54 with straight blades 30 of constant chord dimension with the centerline aligned with the hub 20 axis. The blades 30 may be from two to n in plurality.

Figure 6:
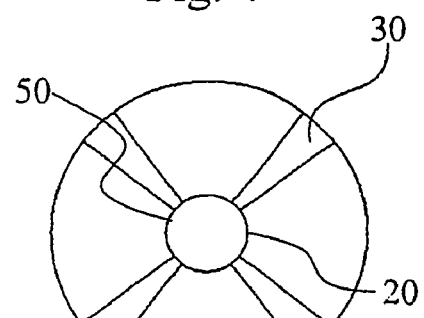
FIG. 6 is an elevation view of a turbine rotor, blade and rim assembly with perpendicular blades according to the invention.

FIG. 6 is an elevation view of a rotor disk 50 having straight blades 30 narrow at the hub 20 and wide at the tips. Optionally, straight blades 30 wide at the hub 20 having narrow tips may be used (not shown). All blades 30 are symmetric hydrofoils in cross section. The blades 30 may be from two to n in plurality.

Figure 7:
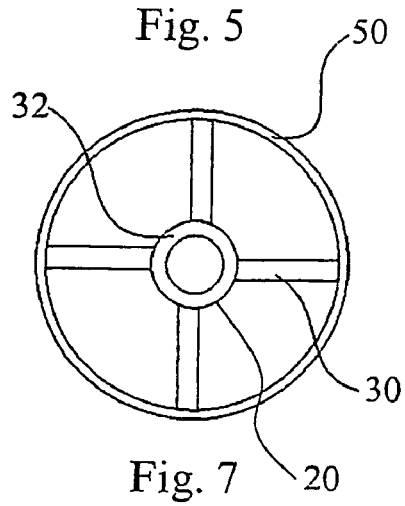
FIG. 7 is an elevation view of a turbine rotor, blade and rim assembly with perpendicular offset blades and a sealife tunnel according to the invention.

FIG. 7 is an elevation view of a rotor disk 50, blade 30 and rotor rim 54 (see FIG. 1) with perpendicular offset blades and a sea life bypass 32. The sea life bypass 32 is a longitudinal hole through the central axis of the hub 20 through which sea life such as fish and mammals can pass if they enter into the turbine generator unit 10. The bypass 32 is possible due to the rim generation style of the turbine generator unit 10, leaving the hub 20 as a small structural member used only as a rotor disk 50 bearing shaft and not housing the generator 90.

Figure 8:
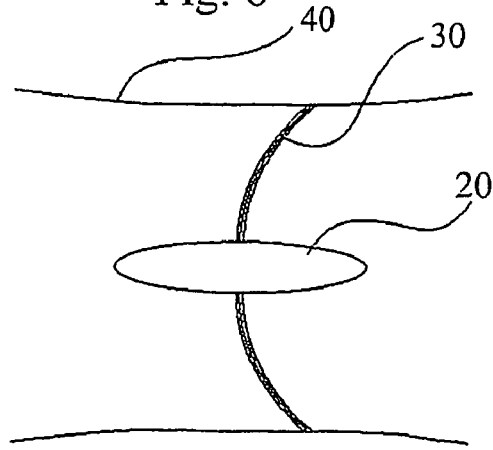
FIG. 8 is a cross sectional side view of a turbine blade configuration according to the invention.

FIG. 8 is a section view of a turbine rotor disk arrangement with a curved surface for the rotor disk 50 instead of a flat plane. This arrangement may be used with blades 30 of constant thickness of variable thickness. This arrangement may be used with single or multiple rotor disks and with any arrangement of rotor blades 30 from the previous figures.

Figure 9:
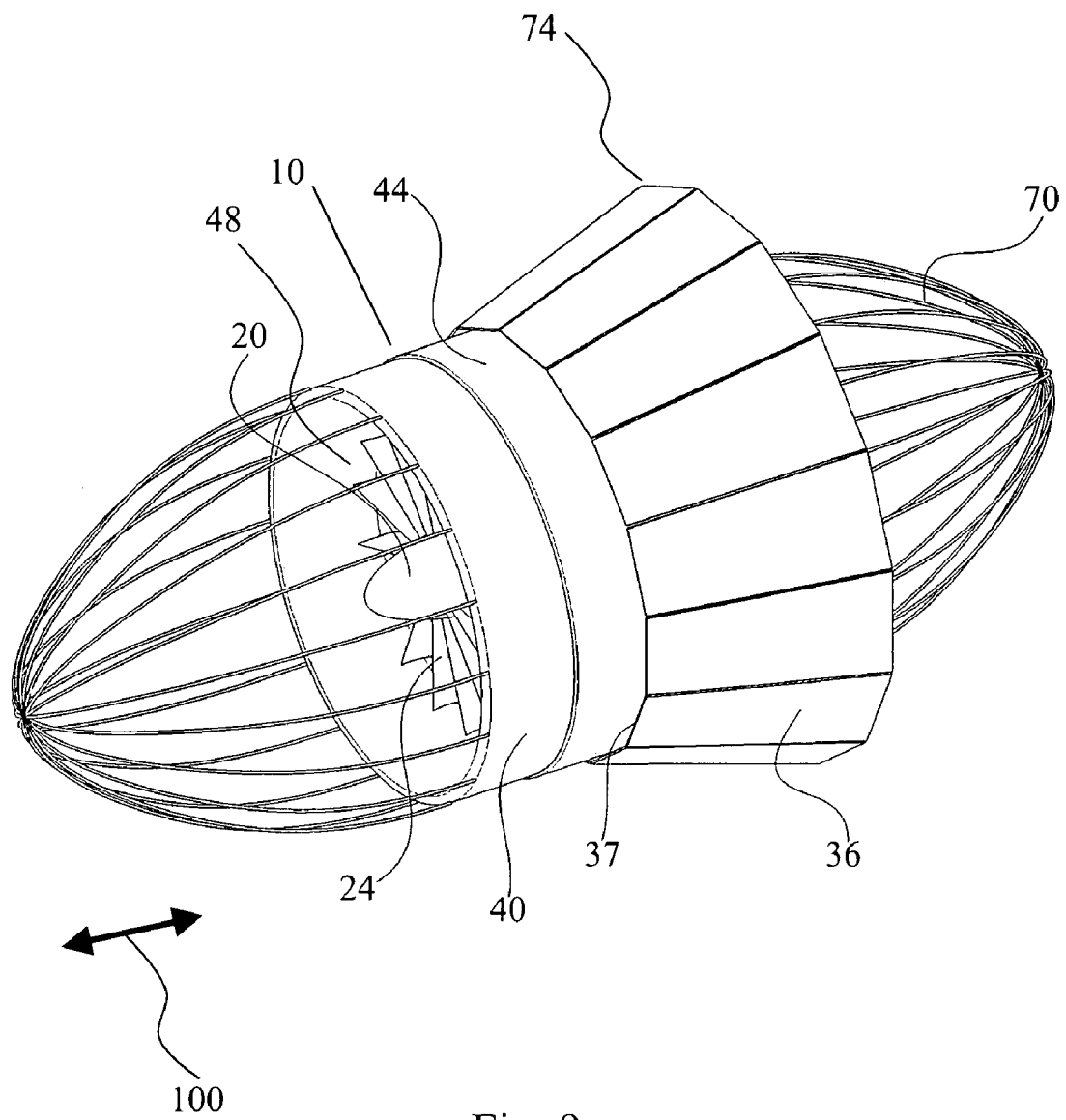
FIG. 9 is an isometric view of a hydraulic turbine generator unit according to the invention.

FIG. 9 is an isometric view of the preferred embodiment of the invention. The turbine generator unit 10 may be encapsulated by a generally elliptical screen 70 attached to the duct ends 40. The screens 70 may consist of a plurality of bars extending longitudinally from the duct 40 and converging at points in front of, above, aside or below the two hub 20 ends. The screen 70 acts to minimize ingress by marine creatures and as a shield against seaweed, debris and ocean life entering the turbine generator unit 10 which may otherwise clog or damage the turbine blades 30, and guide vanes 24. Due to the shape of the screen and the tide and water flow 100 changing direction, the screens 70 are self-cleaning. An augmenter skirt 74 comprised of articulating panels 36 which have hinges 27 (not shown) about the longitudinal midplane of the circumference of the turbine generator unit 10.

Referring again to FIG. 7, the screen 70, when employed in combination with a sea life bypass 32, ends at the outer rim of the bypass mouth 32 and extends to the leading edge of the duct 40, such that while debris is caught in the screen 70, sea life can pass through the turbine generator unit thereby lessening the environmental impact of the power generation.

Referring again to FIG. 9, the turbine assembly consisting of the rotor disk 50 (and 52 if applicable)(not shown here) and generator may be inserted and removed as a unit for ease of maintenance, leaving the duct 40 and deployment means in place. The rotor disk 50 and generator 90 (not shown here) may be a self contained core unit with a lug or hook on the top surface. A duct rim spacer 44 being a flexible central portion of the duct 40 is provided to enable removal of the turbine assembly. Upon removing the duct rim spacer 44 the turbine assembly 48 may be raised to the surface for servicing or replacement.

Figure 10:
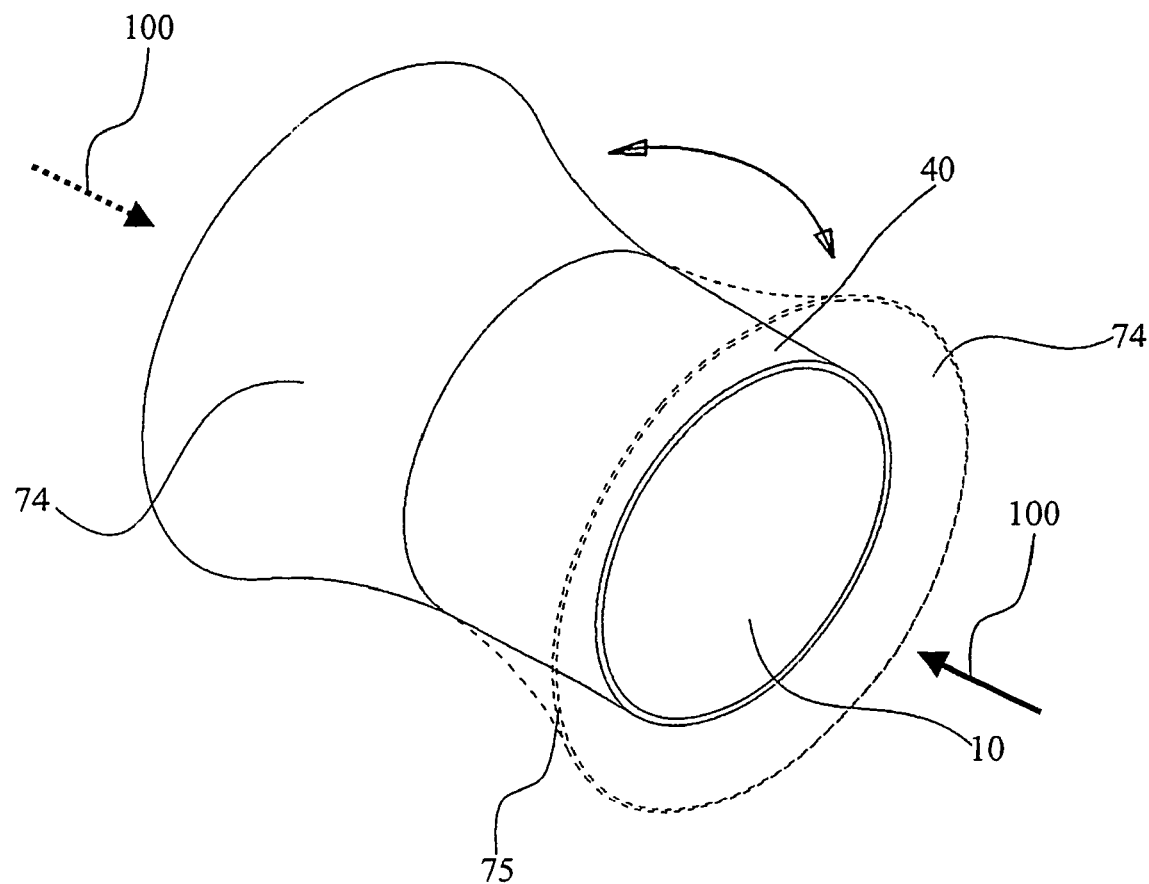
FIG. 10 is an isometric view of a turbine generator flexible augmenter skirt on the duct according to the invention.

FIG. 10 shows a duct 40, with a flexible augmenter skirt 74, which is attached at the midpoint of the turbine generator 10. The skirt 74 comprised of a durable flexible material such a Spectra™ weave fiber is formed such that the dynamic pressure of the flow 100 will force the skirt 74 to the appropriate location with the flared end of the skirt 74 at the exit of the duct 40. The skirt 74 may have stiffening rings (not shown) embedded in it, but will certainly have a stiff skirt ring 75, at its largest and distal diameter, to hold the proper shape while subjected to the large dynamic pressures of the tidal flow 100. The skirt 74 can be comprised of durable composite material such as a 'spectra weave', or metallic articulated components. The skirt 74 has a larger circumference at the trailing edge such that it flares out from the duct 40. The skirt 74 creates a low-pressure area at the outlet of the turbine generator unit 10, which minimizes turbine efficiency losses due to the Betz effect. Fixed augmenters of this type cause the flow through the turbine to be increased, and are well characterized by those familiar in the art. Both flexible fabric and articulated metal skirts 74 are moved backwards and forwards by the dynamic force of the tidal current, when the tide changes direction, so that the skirts 74 always extend out backwards at or over the duct 40 outlet. This is a bi-directional, singly located, augmenter skirt 74 that is hinged, or affixed about the mid-portion of the turbine duct 40 circumference. The skirt may be installed about the entire circumference, or for just portions of the circumference, as desired by the specific installation, or the plurality of the units.

Figure 11:
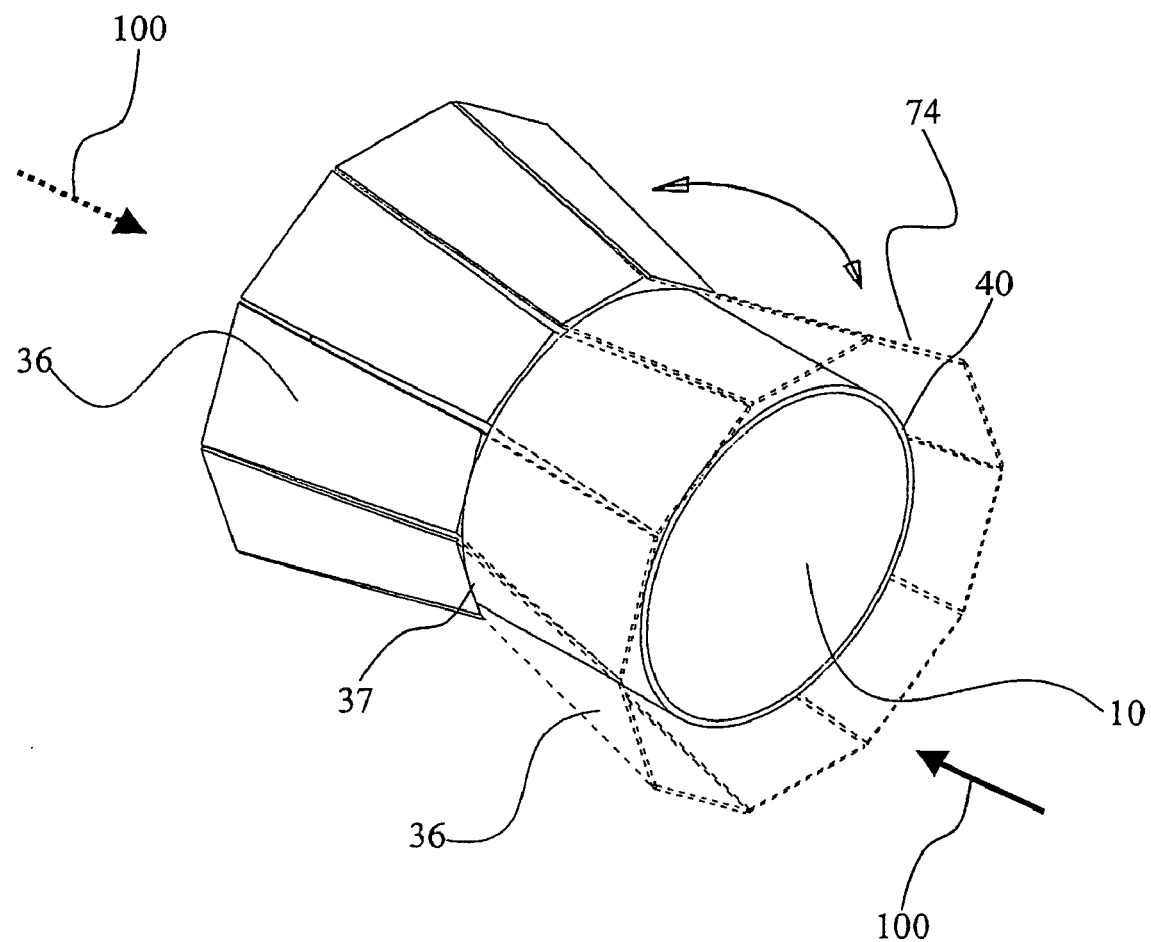
FIG. 11 is an isometric view of a turbine generator articulated augmenter skirt on the duct according to the invention.

FIG. 11 shows a duct 40, with an articulated augmenter skirt 74, which is attached by hinges 37 at the midpoint of the turbine unit 10. The skirt 74 is comprised of durable and stiff panels and is positioned by the dynamic pressure of the flow 100 that will force the skirt 74 to the appropriate location with the flared end of the skirt segments at the exit of the duct 40. The turbine generator units 10 are comprised of duct 40 structure and materials that provide buoyancy beneficial for deployment and maintenance operations.

The turbine generator unit is constructed of durable corrosion resistant materials. In the preferred embodiment marine grade concrete containing lightweight internally stiffened aggregate in sufficient proportion that the whole structure is positively buoyant is used for the duct 40 and a corrosion resistant high strength material is used for the rotors 50, and shaft 19 which comprise the turbine 10 and other principal components. Materials such as advanced composites, concrete and steel may be used. The turbine generator unit 10 is coated with a silicon glass product as is known in the art to reduce hydraulic losses and to minimize fouling by attachment of marine creatures.

The duct 40 is coated with a new silicon glass product and is preferably formed from lightweight buoyant concrete enabling the turbine generator unit 10 to be towed to the site for deployment, then moored such that the turbine generator unit 10 floats at a predetermined depth below the surface of the water 16. The turbine generator unit 10 is lowered into a river or sub-sea location as desired. In the preferred embodiment the turbine generator unit uses tidal forces to generate power.

Figure 12:
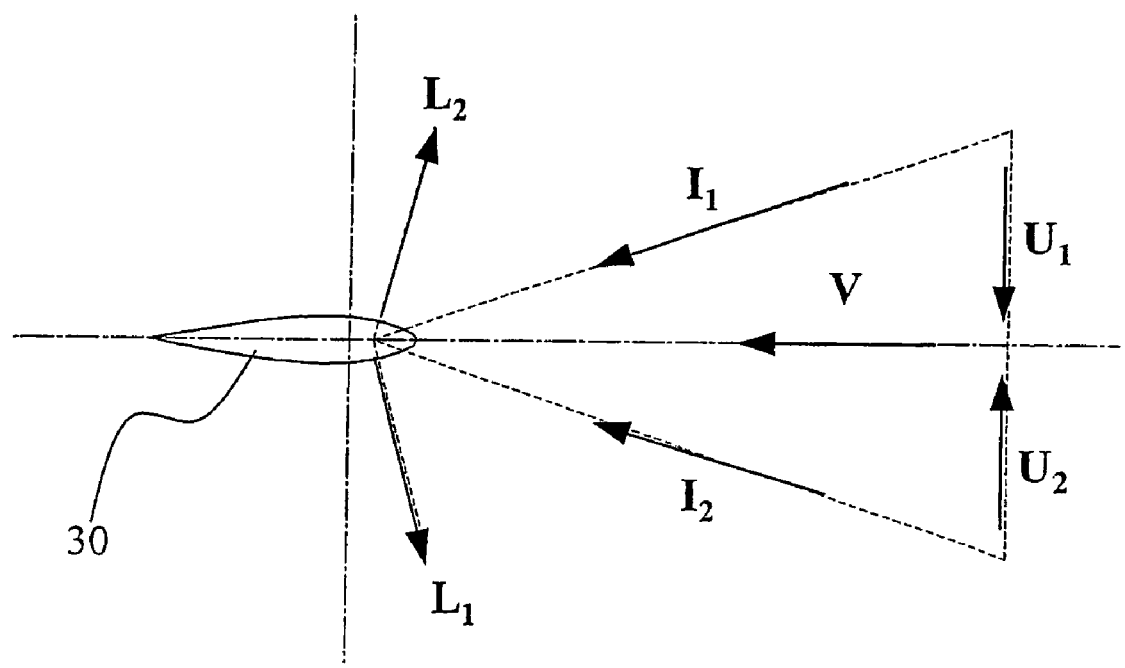
FIG. 12 is a vector diagram of fluid flow across a symmetrical foil according to the prior art.

FIG. 12 is a vector diagram of airflow across a prior art symmetrical foil where Wells in U.S. Pat. No. 4,221,538 diagrams the driving vector across the hydrofoil section of the blade 30 where V is the relative velocity of the flow opposite the direction of the blade 30, I1 and I2 are the resultant fluid vector incident velocities, U1 and U2 represent bi-directional water flow 100 and L1 and L2 represent the normal component of lift. The lift across the hydrofoil blade 30 accelerates the rotor 50 in an efficient and powerful manner.

Figure 13:
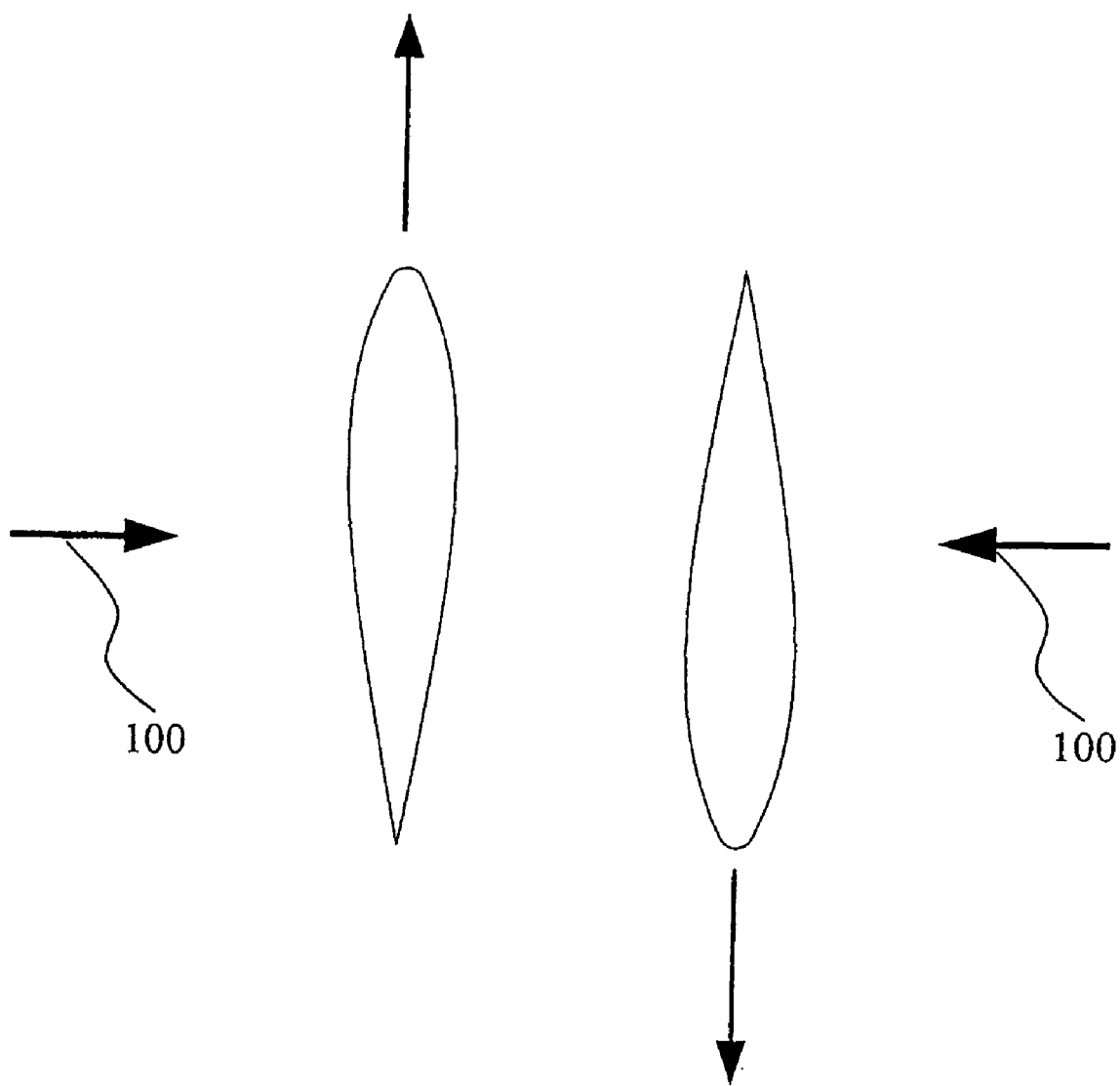
FIG. 13 is a flow diagram across two counter-rotating blade sections as components of a dual inline turbine according to the prior art.

FIG. 13 is a flow diagram across two hydraulic counter-rotating blade 30 sections as components of a turbine generator unit with dual coaxial rotor disks 50. This prior art system is effective to reduce downstream losses in energy due to swirl and increase operating efficiencies over a greater velocity spectrum.

Figure 14:
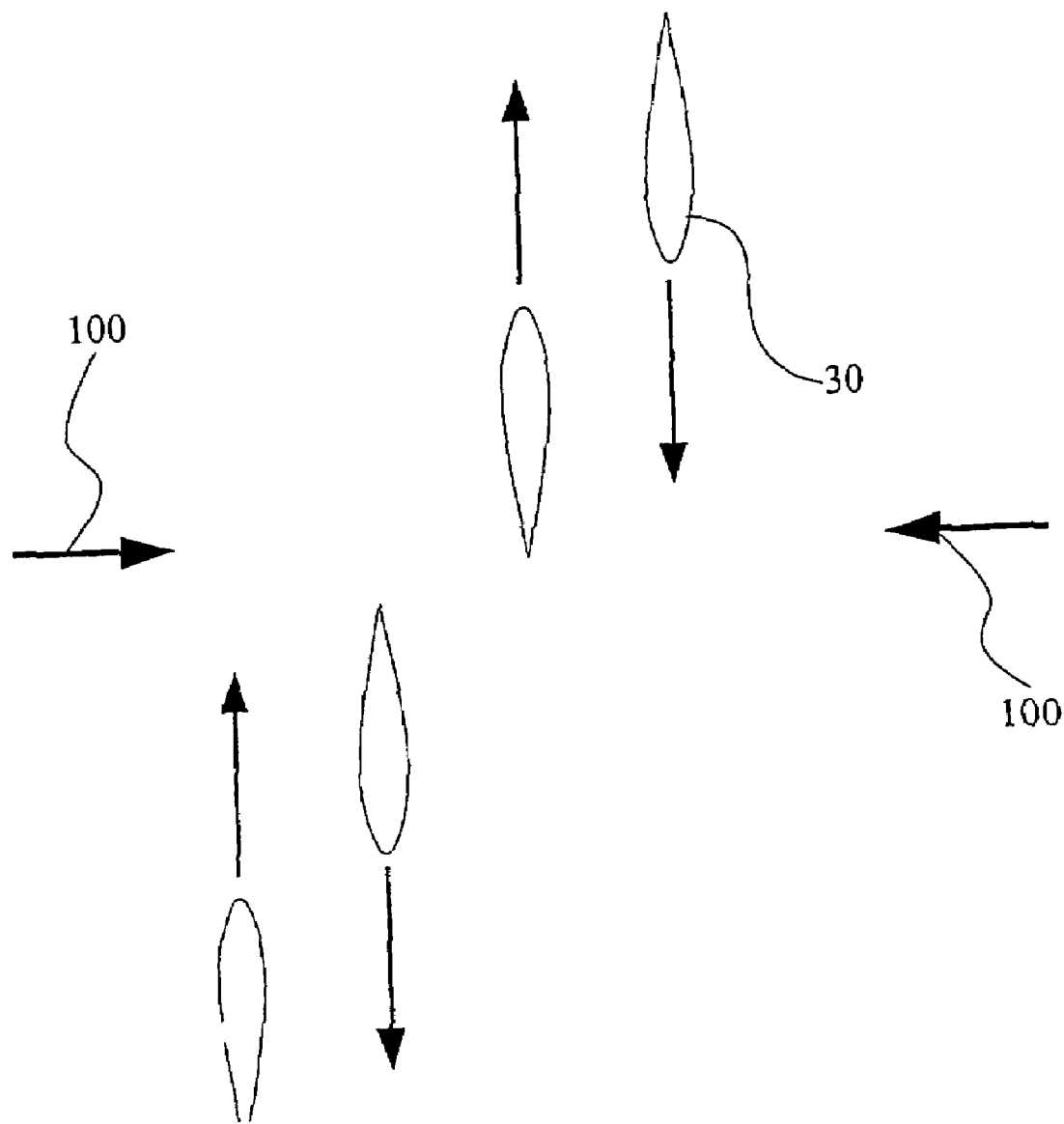
FIG. 14 is a flow diagram across four counter-rotating blade sections as components of a cascading pair of dual inline turbine according to the invention.

FIG. 14 is a flow diagram across a cascading pair of coaxial rotor 50 turbine generator units. The use of multiple cascades minimizes the pressure drops across multiple units for regimes of very high velocity. The number of cascading pairs of counter-rotating disks is two to n in plurality.

Figure 15:
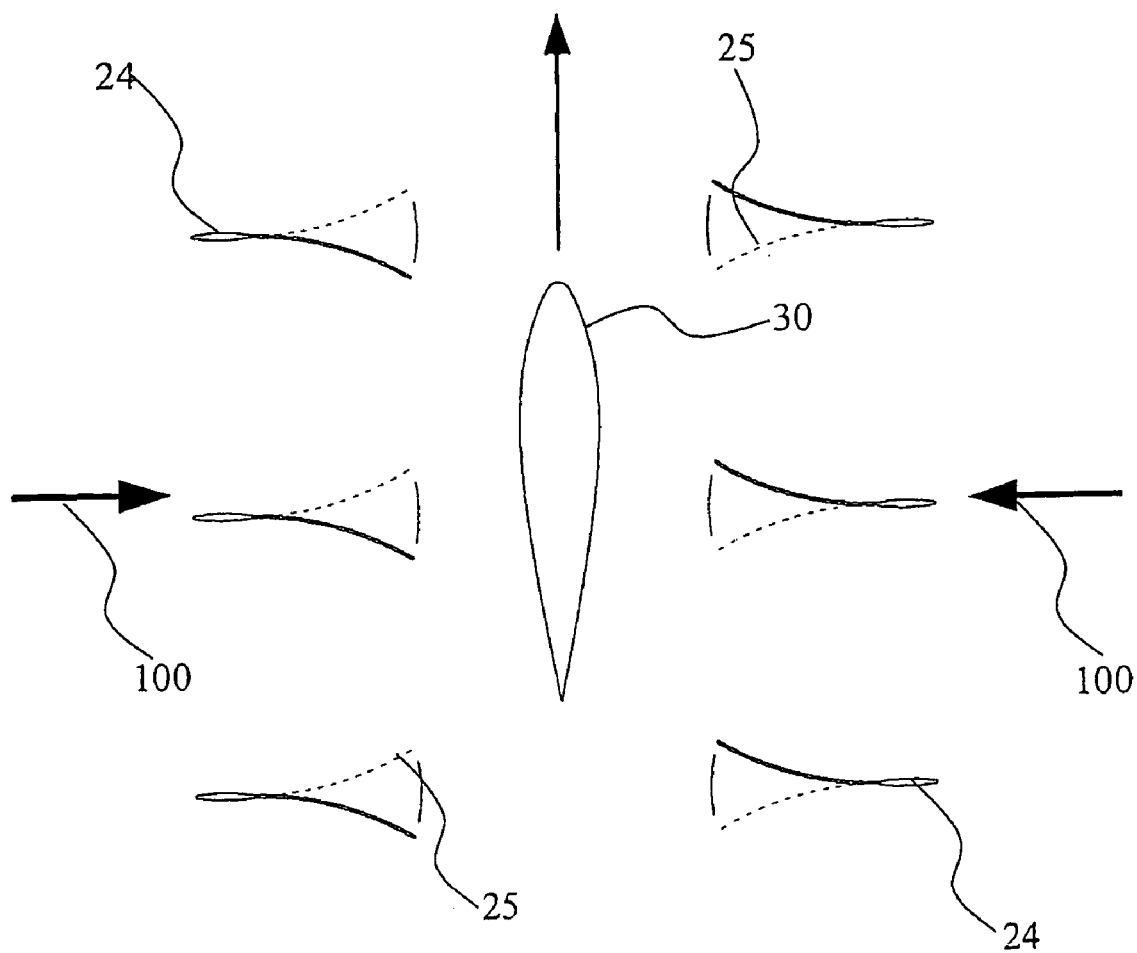
FIG. 15 is a flow diagram across a rotor blade section and through alternating position inlet and outlet guide vanes as a component of a turbine according to the invention.

FIG. 15 is a flow diagram across a single rotor disk 50 with hydrofoil blade 30 section and through alternating position inlet and outlet guide vanes 24. The vanes 24 are flexible and controlled by a linkage with the articulated skirt. The dynamic pressure of the flow 100 causes the skirt to adjust, thereby moving the guide vanes to the appropriate position. The upstream guide vanes will provide a positive angle of attack and the downstream guide vanes will reduce momentum swirl losses. When the water flow 100 is reversed the rotor 50 turns in the same direction, but the vanes 24 reverse or flip by hinging occupy the position shown in the dotted lines 25. In this variation, the vane 24 leading edges 28 are rigidly fixed to the hub 20 structure and the interior surface of the duct 40.

Figure 16:
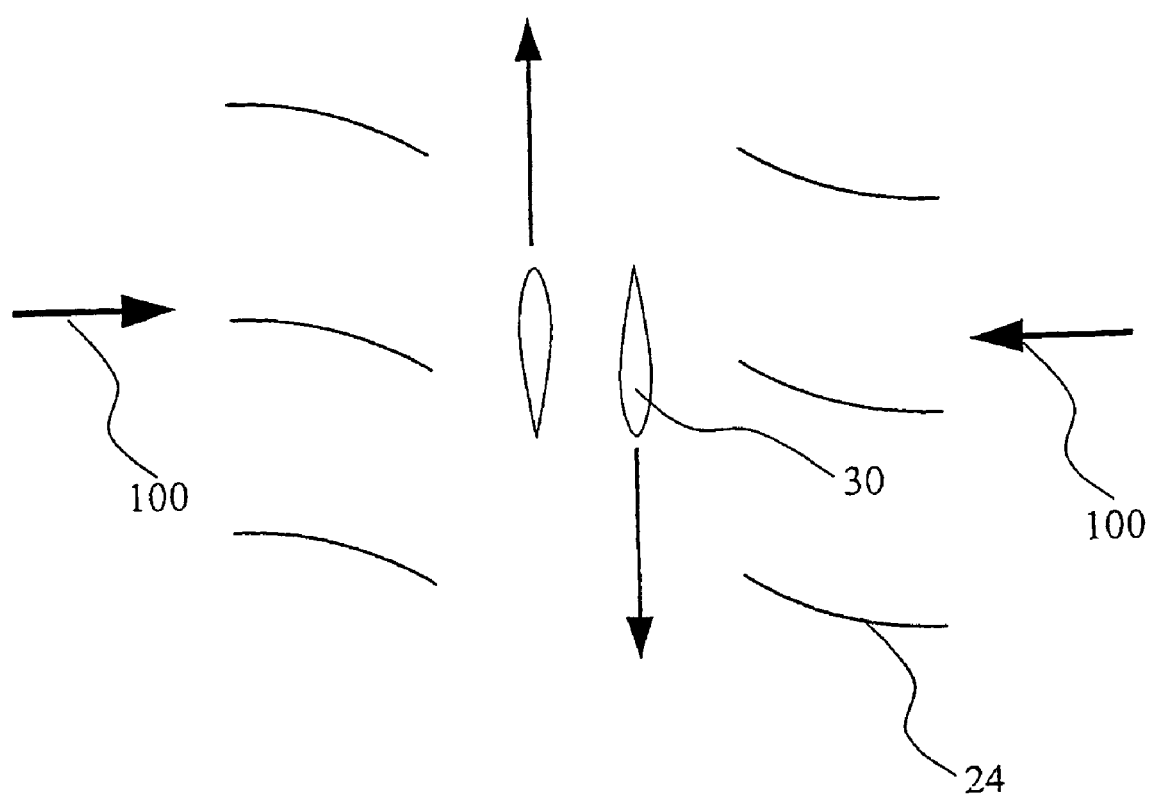
FIG. 16 is a flow diagram across two hydraulic counter-rotating blade sections and through inlet and outlet guide vanes as components of a dual inline turbine according to the invention.

FIG. 16 is a flow diagram across two hydraulic counter-rotating blade 30 sections and through inlet and outlet guide vanes 24 as components of a dual inline rotor 50 turbine generator unit. In the preferred embodiment, the guide vanes 24 are permanently fixed in the configuration shown.

Figure 17:
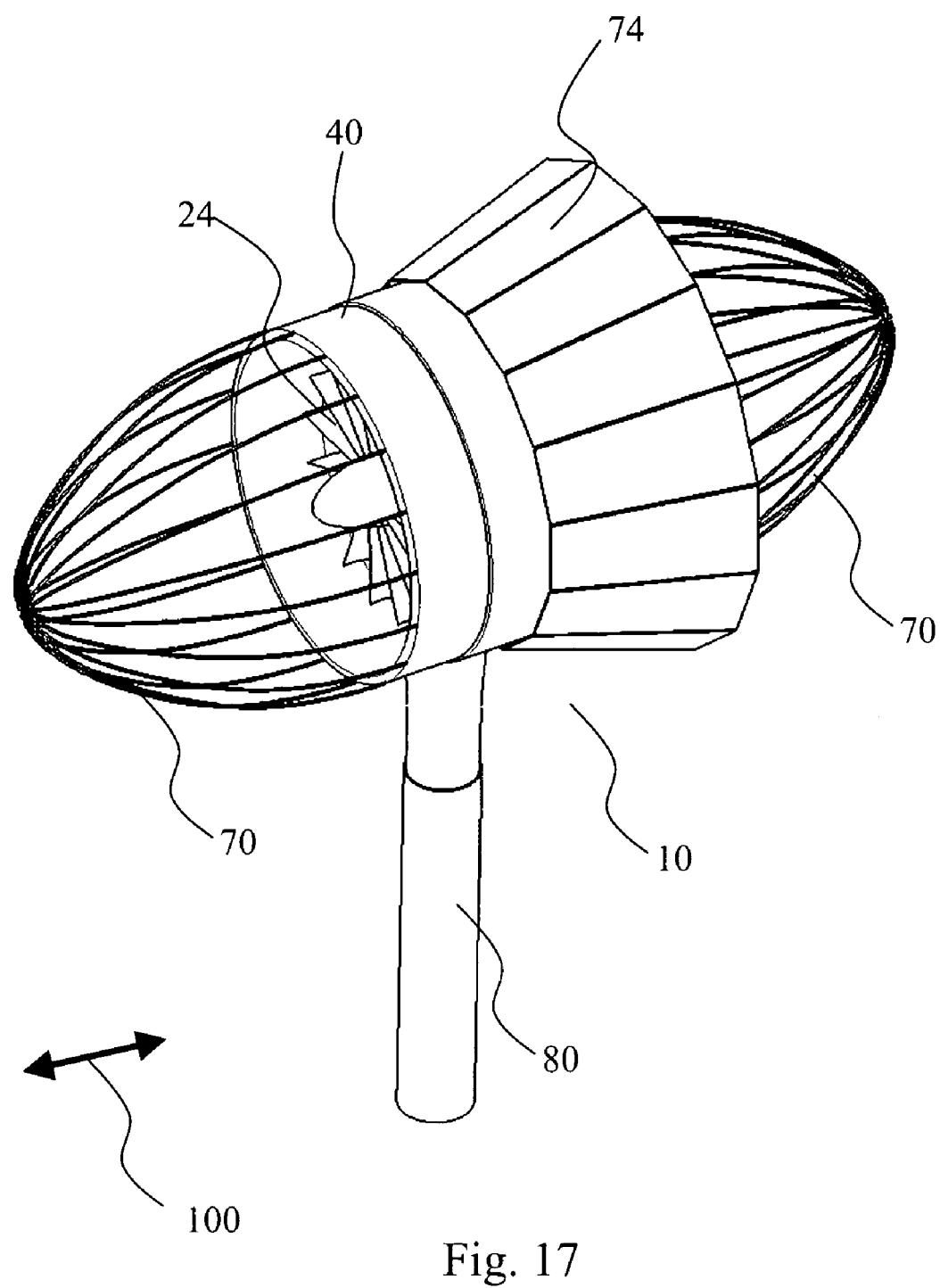
FIG. 17 is an isometric view of a turbine generator unit mounted on a telescoping pylon according to the invention.

FIG. 17 is an isometric view of a hydraulic turbine generator unit 10 mounted on a telescopic pylon 80. In the preferred embodiment the turbine generator unit 10 is mounted on a pylon 80 which may be telescopic to enable remote height adjustments of the turbine generator unit 10, including raising the turbine generator unit 10 above the surface of the water 16 for maintenance purposes.

Figure 18:
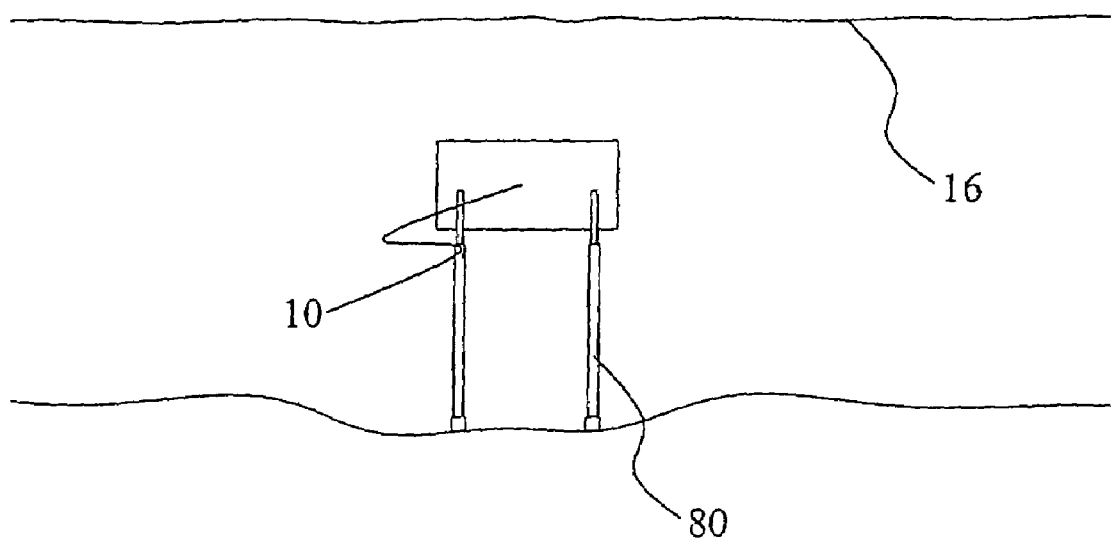
FIG. 18 is a side elevation view of a turbine generator unit mounted on telescoping pylons according to the invention.

FIG. 18 is an elevation view of a turbine generator unit mounted on a plurality of telescoping pylons 80 underwater in a river or tidal stream. Installation, removal and servicing are facilitated by raising or lowering the telescoping pylons 80 to access the turbine generator unit. Dual coaxial rotor disks 50 and 52 may be used, as well as additional turbine generator units 10 on the same pylon 80 set. Any known cable system to remove power and to control the turbines turbine generator unit 10 may be used.

Figure 19:
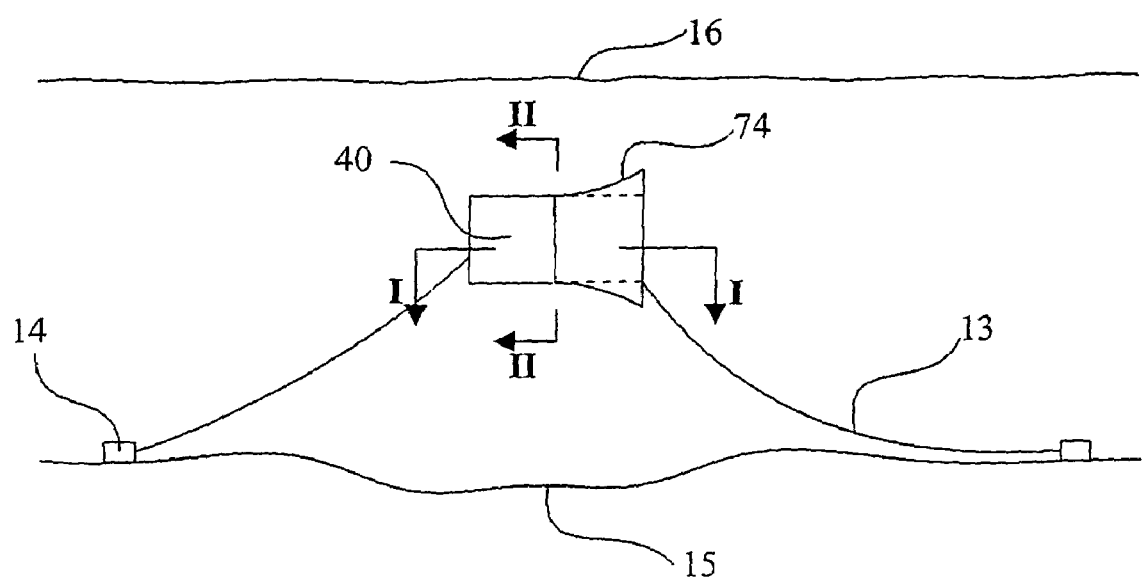
FIG. 19 is a side view of a tethered turbine generator unit according to the invention.

FIG. 19 is a side elevation view of a turbine generator unit 10 tethered via external lugs and cables 13 to a set of two four or more anchors 14 on the ocean or riverbed 15. The anchors may be of any type including galvanized steel ship anchors or concrete blocks. The cables 13 are attached to each end of the turbine generator unit 10, which is thereby held in place. As the rotors 50 and 52 are bi-directional, the turbine generator unit may remain fixed in place.

Figure 20:
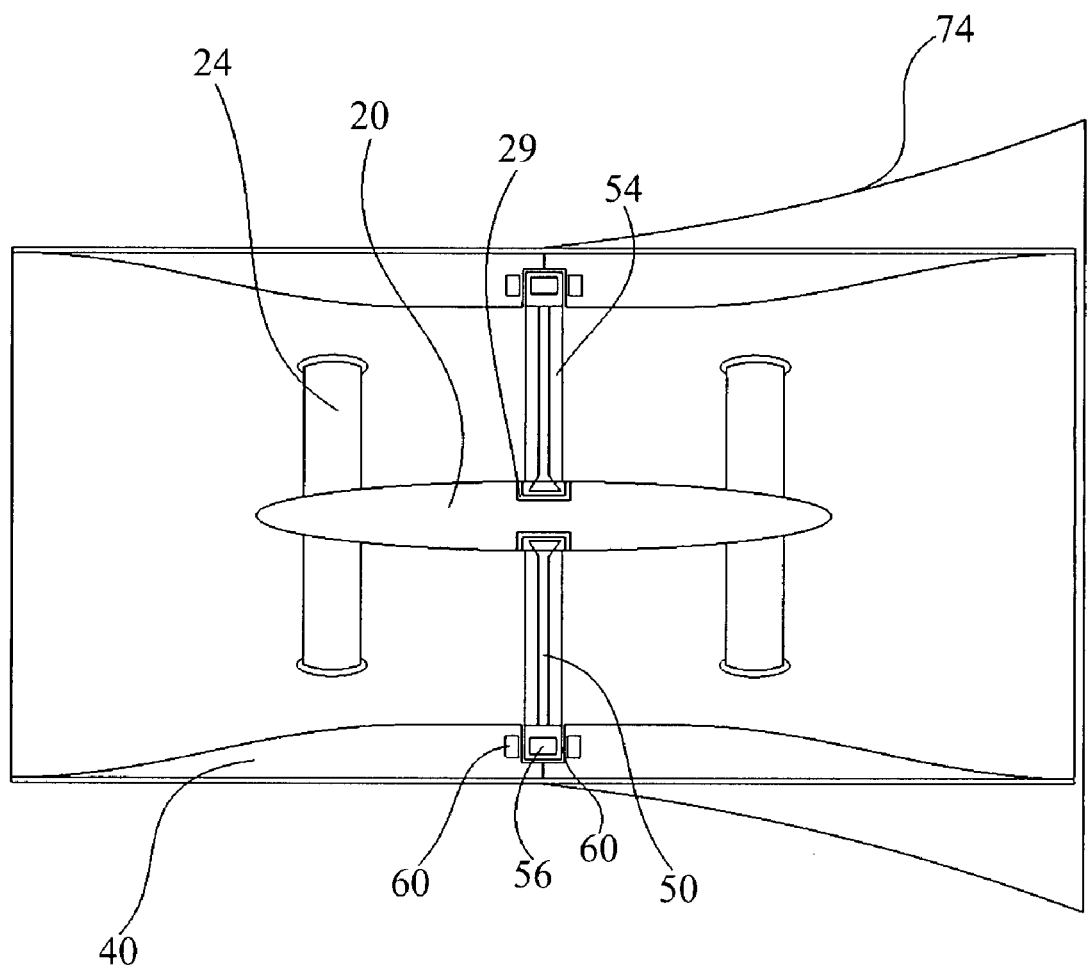
FIG. 20 is a sectional view of FIG. 19 along I-I of a single turbine generator according to the invention.

FIG. 20 is a sectional view of FIG. 19 along I-I of a single rotor 50 turbine generator.

Figure 21:
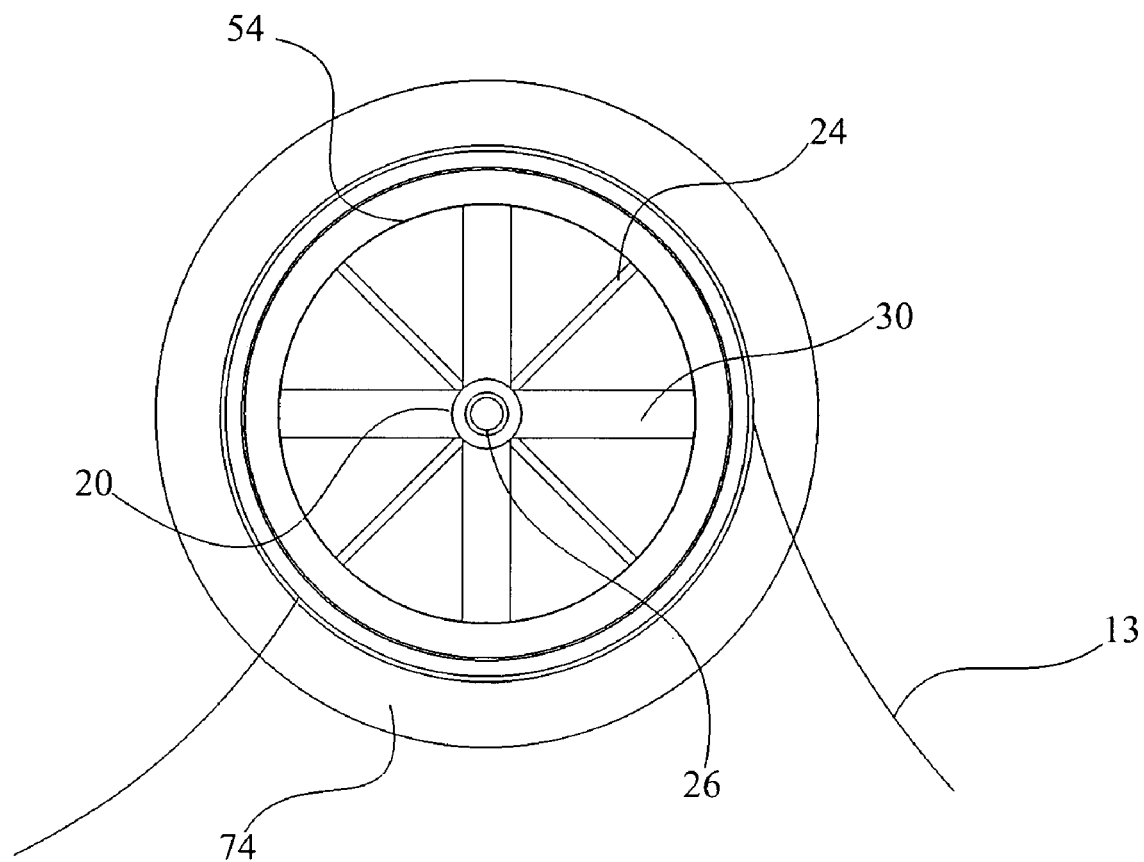
FIG. 21 is a sectional view of FIG. 19 along II-II of a single rotor disk turbine generator according to the invention.

FIG. 21 is section view of FIG. 19 along II-II of a single turbine generator unit.

The turbine generator unit 10 may be deployed individually or in groups of two or more turbine generator units 10.

Figure 22:
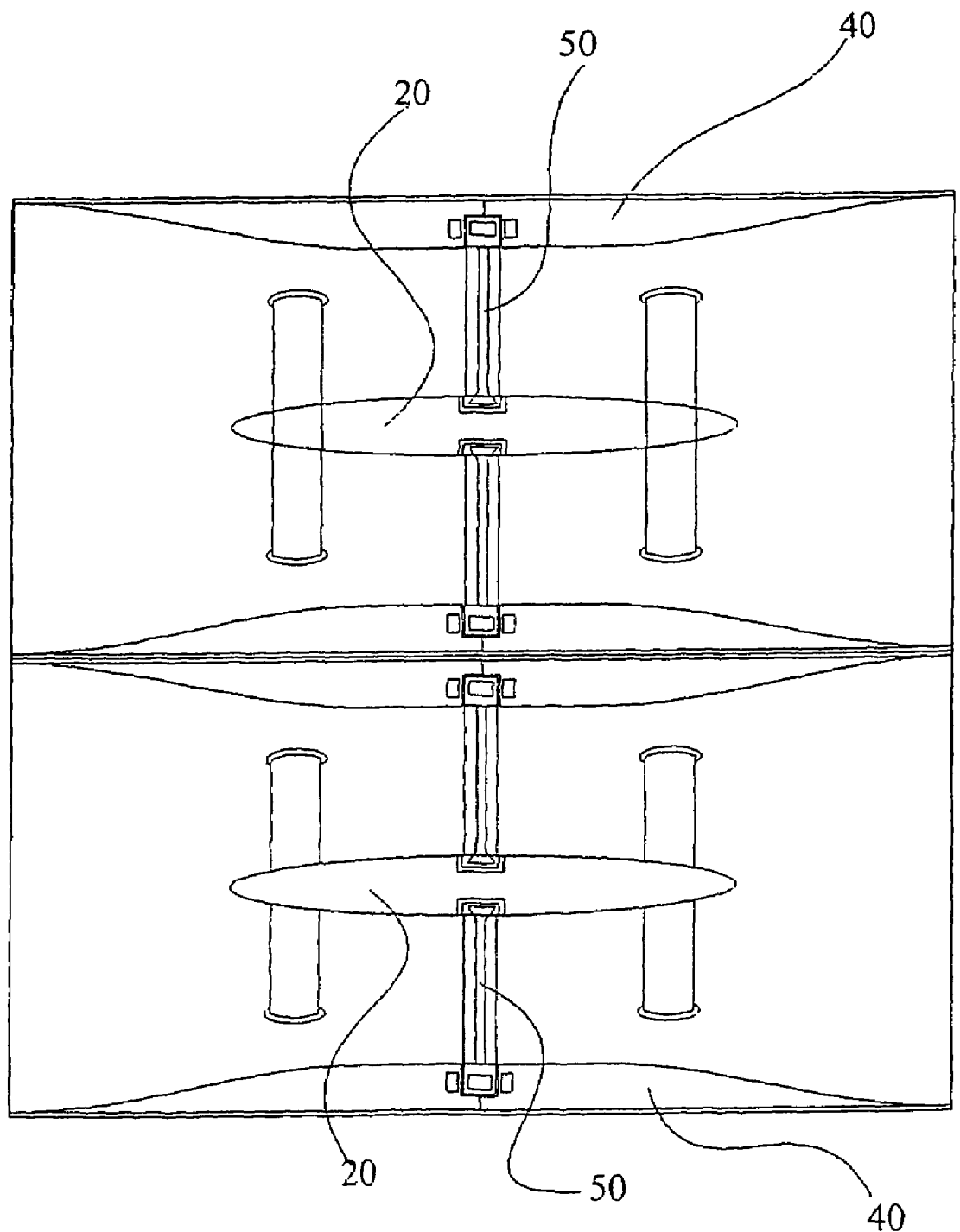
FIG. 22 is a sectional view of FIG. 19 along I-I of a dual rotor disk turbine generator.

FIG. 22 is a sectional view of FIG. 19 along I-I, being a dual side-by-side turbine generator unit 10 variation of the invention.

Figure 23:
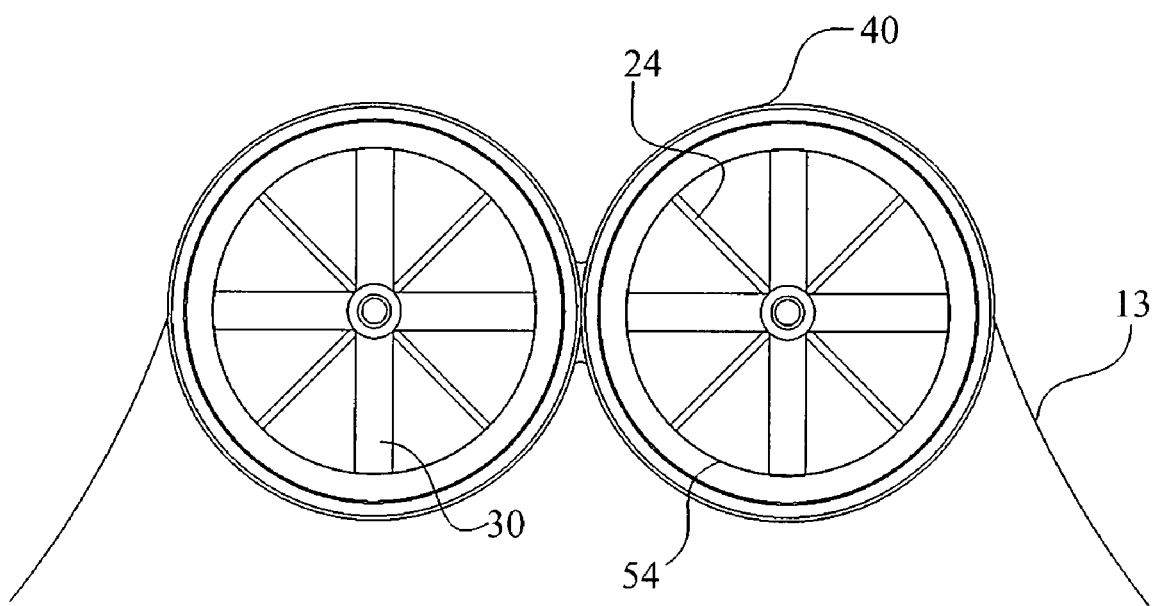
FIG. 23 is a sectional view of FIG. 19 along II-II of a dual rotor disk turbine generator according to the invention.

FIG. 23 is an end view of FIG. 19 of the dual side-by-side turbine generator unit 10 variation. The ducts 40 of the two turbine generator units 10 may be welded, bolted or attached together by any other means suitable to resist hydrodynamic forces.

There are at least five possible methods of deployment anticipated for the turbine generator unit 10. These would be:

mounted on one or more telescopic pylons 80 as shown in FIGS. 17 and 18 floating beneath and attached to a barge 120 alongside a collapsible rubber dam 130 at the side of a river floating tethered beneath the surface as shown in FIG. 19, and in a tidal fence across an ocean inlet or passage as shown in FIGS. 26-30

Figure 24:
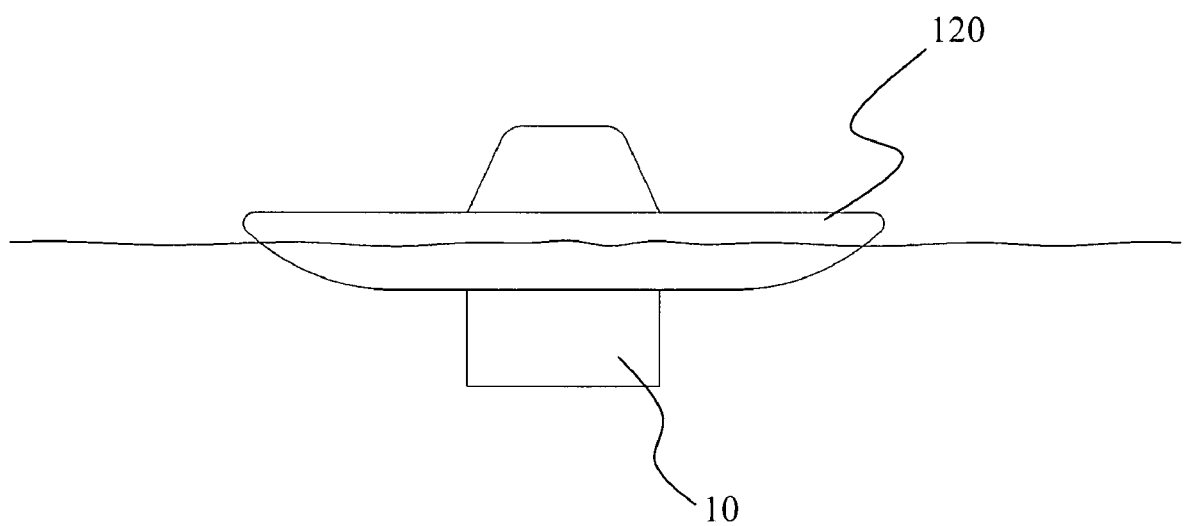
FIG. 24 is a side elevation view of a turbine generator unit mounted under a barge according to the invention.

FIG. 24 is a side elevation view of a turbine generator unit 10 mounted under a barge 120 according to the invention.

Figure 25:
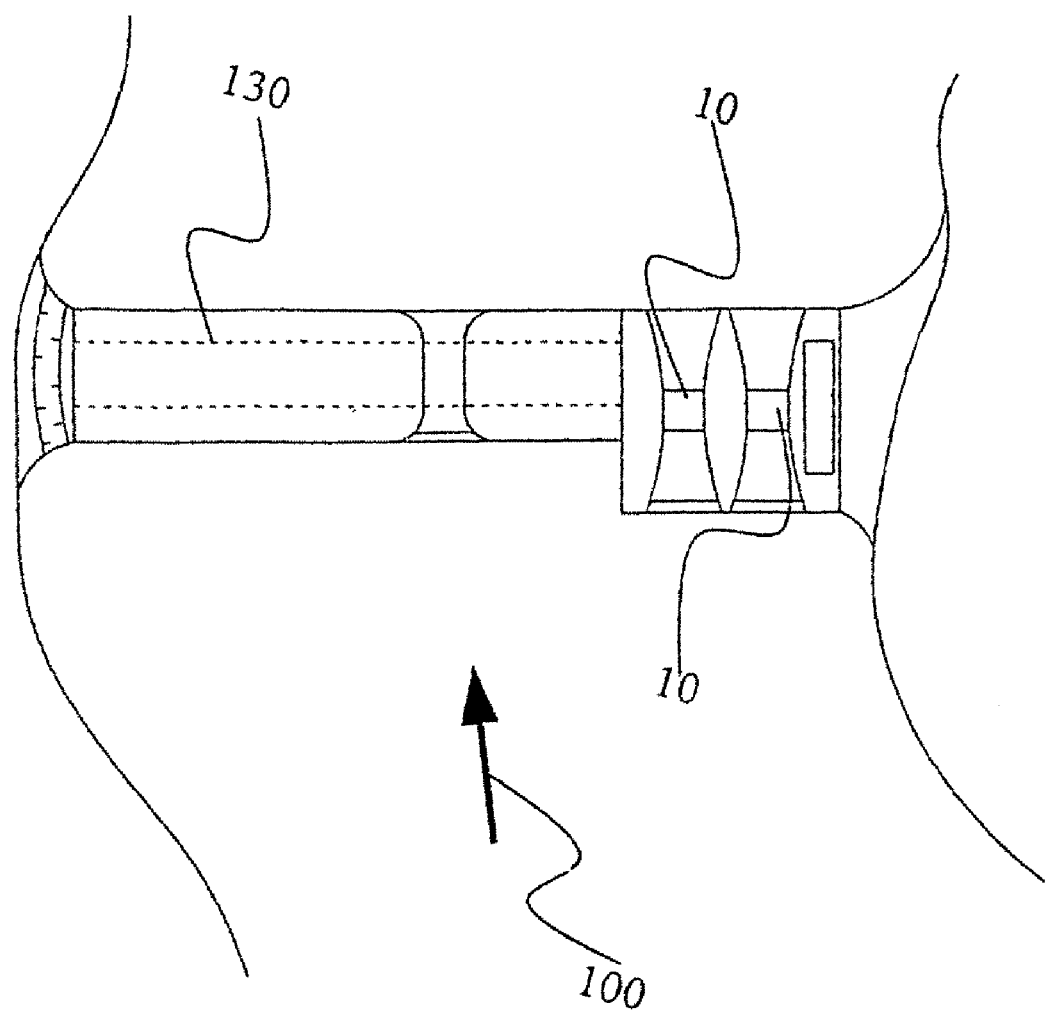
FIG. 25 is a plan view of a turbine generator unit mounted in a small dam according to the invention.

FIG. 25 is a plan view of a turbine generator unit 10 mounted in a small dam 130 according to the invention.

Figure 26:
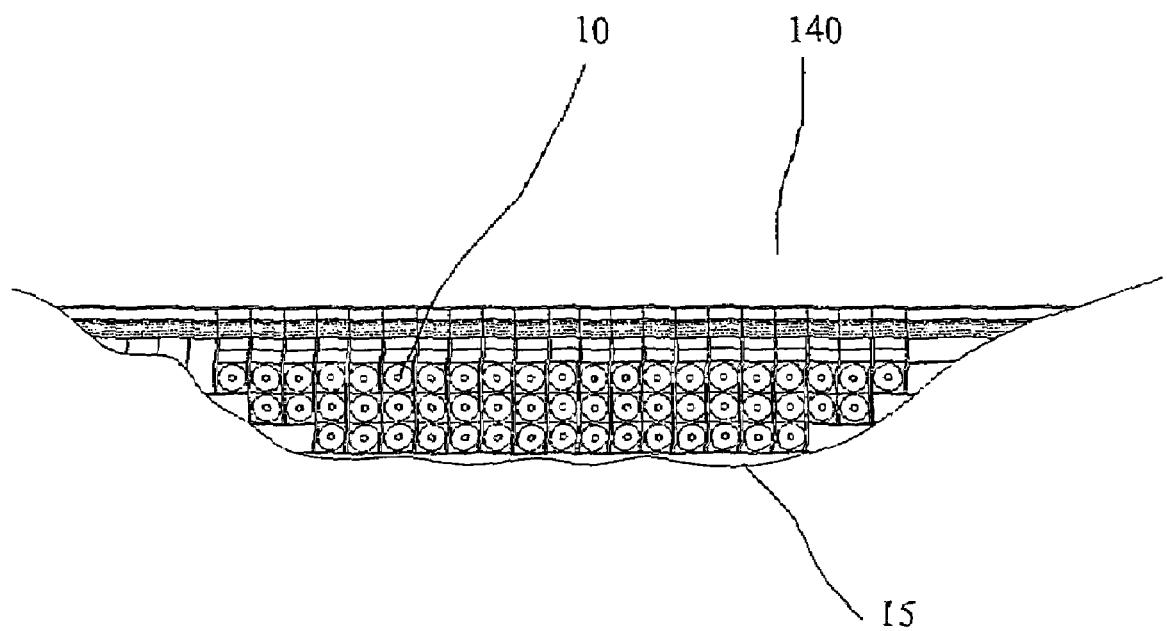
FIG. 26 is an elevation view of a tidal fence according to the invention.
Figure 27:
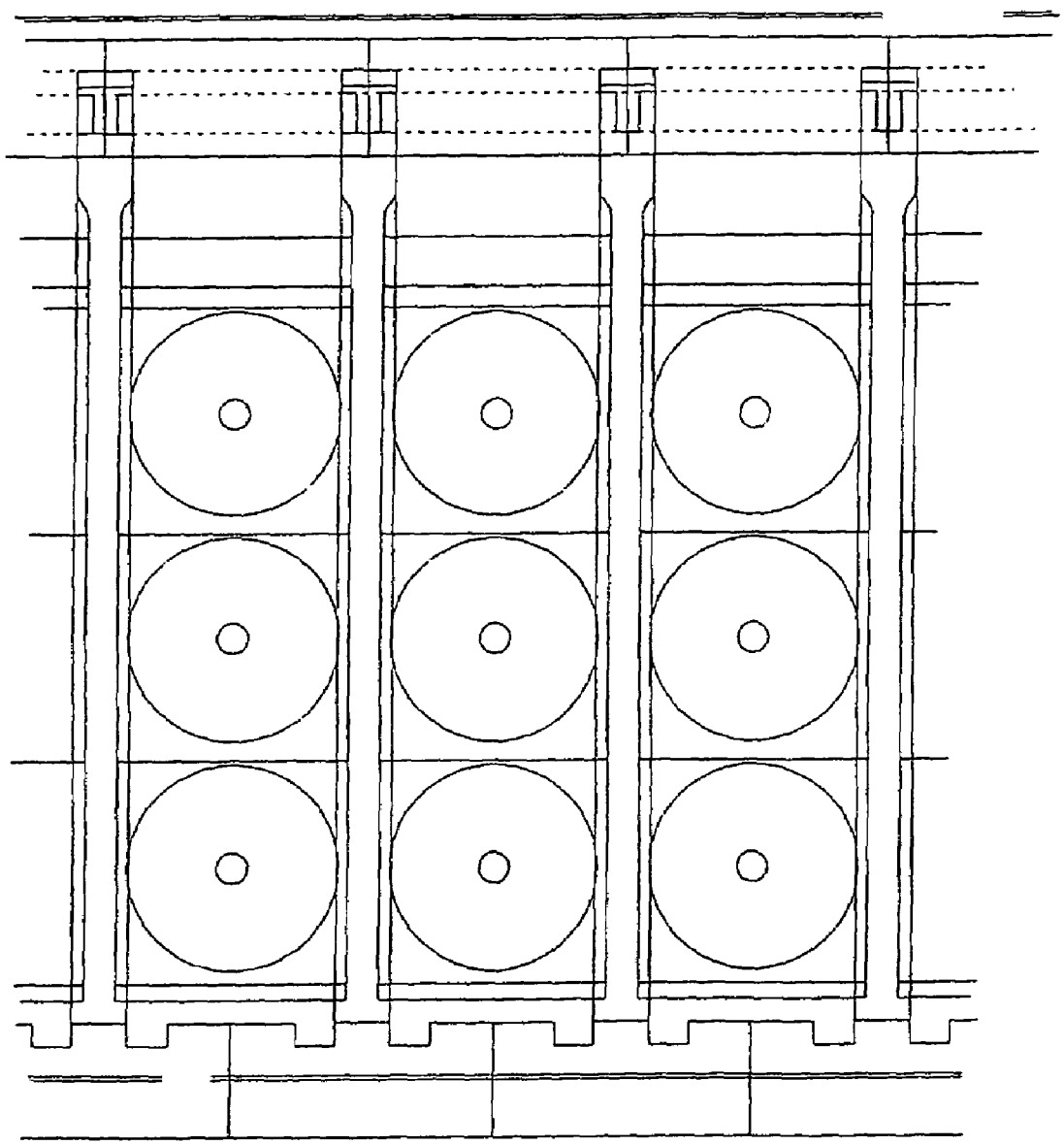
FIG. 27 is an elevation view of a tidal fence according to the invention.

FIG. 26 is an elevation view of a complete tidal fence 140 showing several rows of turbine generator units 10 according to the invention FIG. 27 is a close-up elevation view of a portion of a tidal fence 140 showing nine stacked turbine generator units 10 according to the invention.

Figure 28:
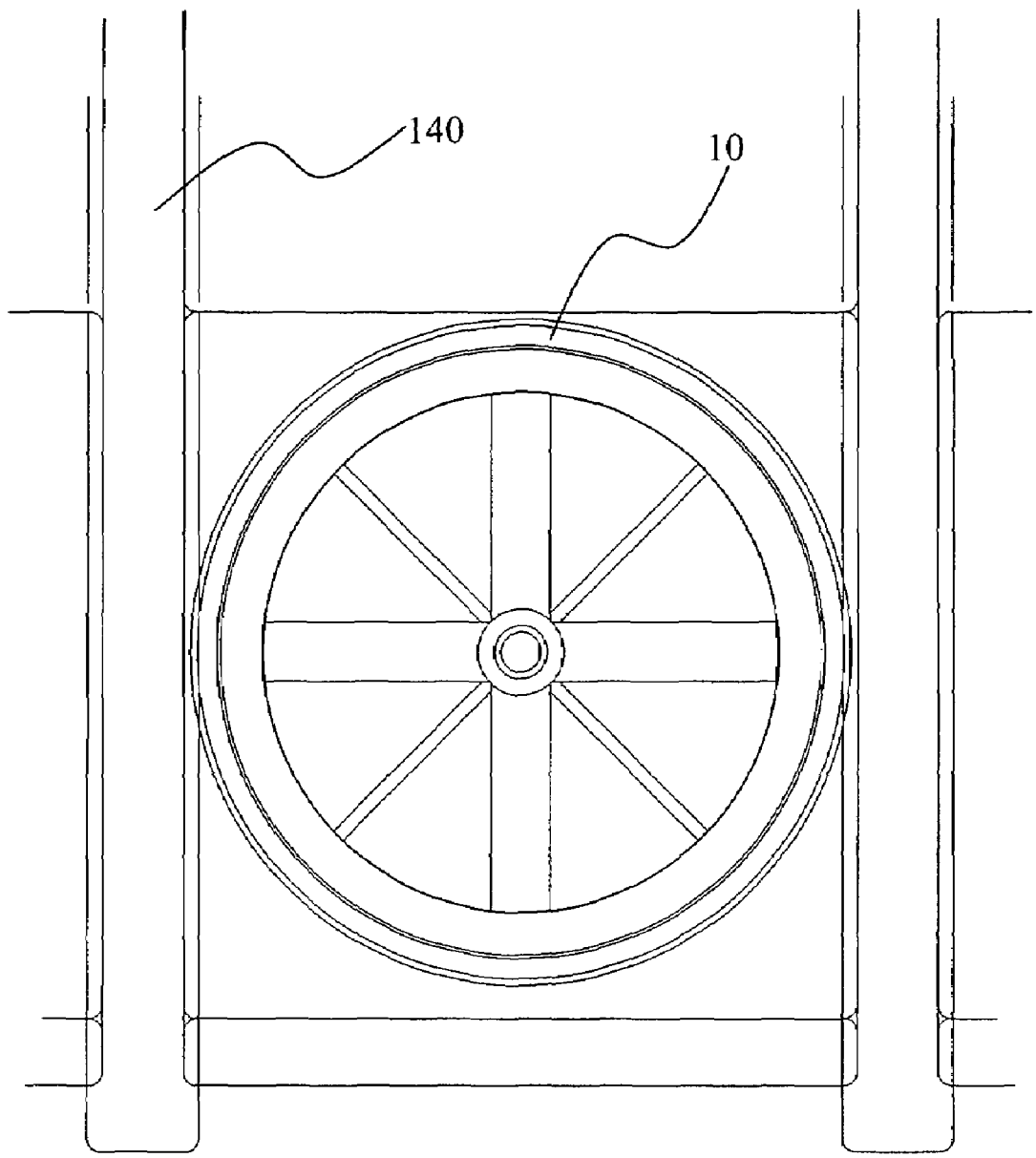
FIG. 28 is an elevation view of a single turbine generator unit in a tidal fence according to the invention.

FIG. 28 is an elevation view of a single turbine generator unit 10 in a tidal fence 140 according to the invention.

Figure 29:
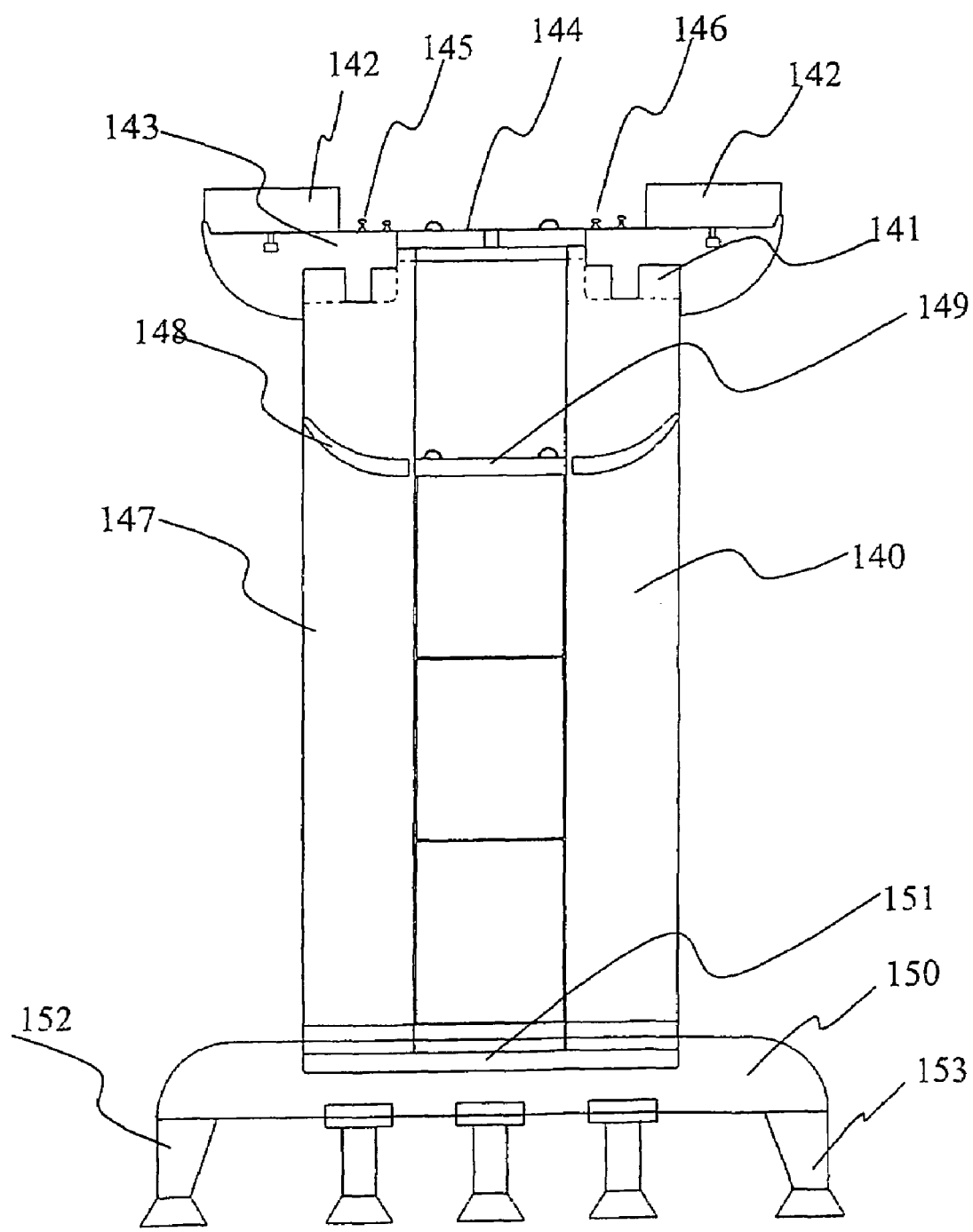
FIG. 29 is a section view of FIG. 27 of 3 stacked turbine generator units in a caisson or a tidal fence.

FIG. 29 is a section view showing three stacked turbine generator units 10 in the structure of a tidal fence 140. The tidal fence 140 according to the invention has a T-Beam structure 141, electrical and monitoring galley and associated road bed 142, the column deck structure comprised of T-Beams 143, access cover 144, and rail lines 145 & 146, assisted by vertical support columns 147. It is additionally comprised of wave diverter 148 and removable anti-cavitation platform 149, gravity foundation structure 150, and associated support web 151, and pylons 152 & 153. This structure supports a multiplicity of turbine generator units 10.

Figure 30:
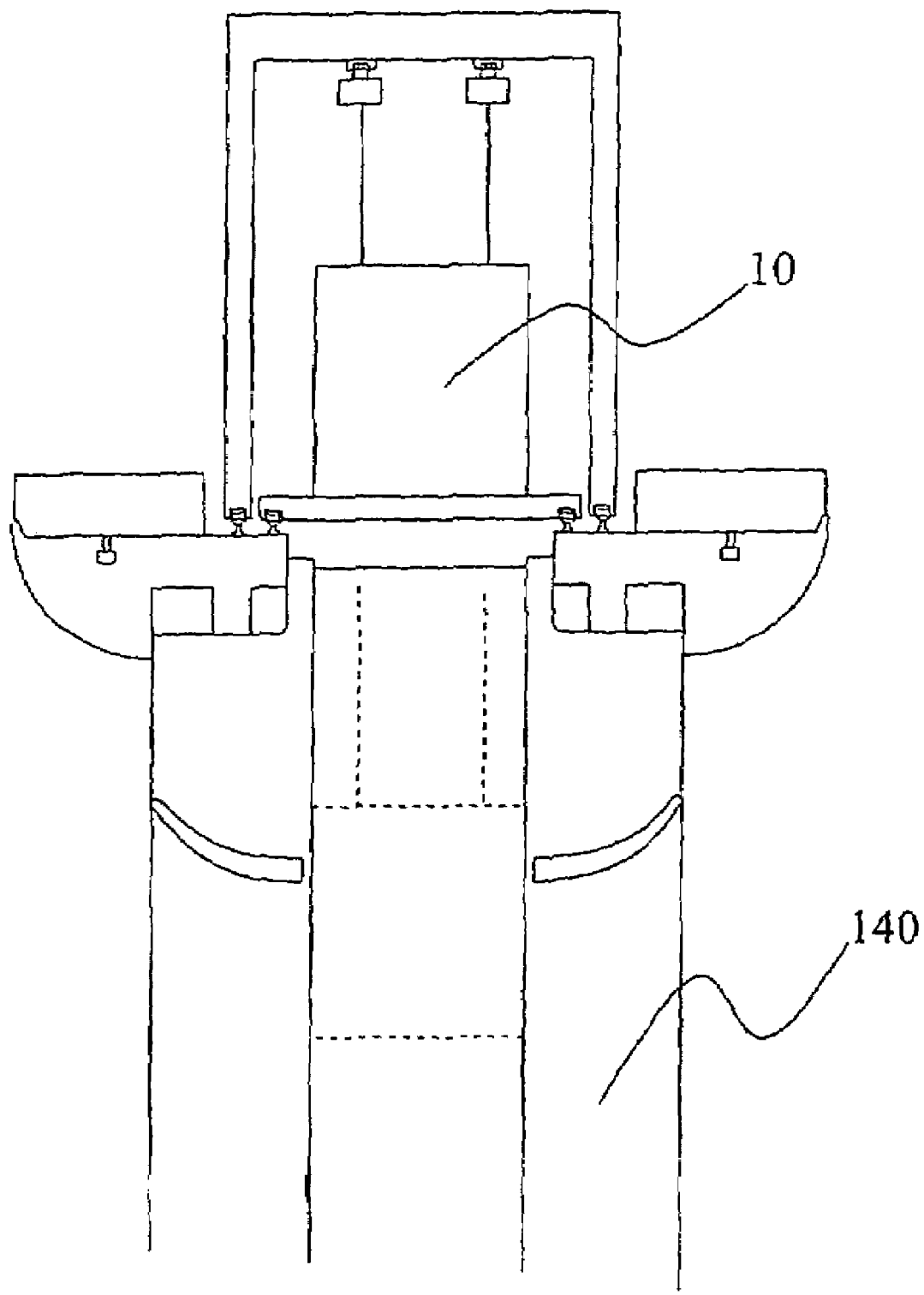
FIG. 30 is a section view of the maintenance capability for removing turbine generator units in cassette form utilizing a gantry that is positioned on the top of the caisson on rails.

FIG. 30 is a section view of the maintenance capability for removing turbine generator units 10 in cassette form utilizing a gantry that is positioned on rails on the top of the tidal fence 140 structure.

The preferred embodiments herein described are not intended to be exhaustive or to limit the scope of the invention to the precise forms disclosed. They are chosen and described to best explain the principles of the invention and its application and practical use to allow others skilled in the art to comprehend its teachings.

As will be apparent to those skilled in art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A hydro turbine generator for generating electrical power from water flow, said apparatus comprising a hub substantially parallel to a water flow and at least one generator and characterized by:
   (a) at least one rotor disk comprising a plurality of hydrofoil blades rotatably attached to said hub and extending radially from said hub;
   (b) a generally cylindrical housing defining a duct, said duct being proximate to the tips of said blades and attached to said hub by a plurality of curved guide vanes extending radially between said hub and said duct, such that said curved guide vanes are operable to change the direction of said water flow.

2. The apparatus according to claim 1 wherein said blades are symmetric in cross section.

3. The apparatus according to claim 2 wherein said blades have two flat faces which are disposed perpendicular to said water flow.

4. The apparatus according to claim 1 wherein there is a first rotor disk and a second rotor disk, said first rotor disk being upstream and rotating in a first direction to the water flow and said second rotor disk being downstream and counter-rotating in relation to said first rotor disk in a second direction to the water flow.

5. The apparatus according to claim 4 wherein said first direction is counter clockwise from the direction of the water flow, and said second direction is clockwise from said water flow direction.

6. The apparatus according to claim 4 wherein said first direction is clockwise from the direction of water flow, and said second direction is counter-clockwise from said water flow direction.

7. The apparatus according to claim 4 wherein when said water flow changes direction, said second rotor disk becomes the upstream disk, and continues to rotate in the same direction, while said first rotor disk becomes the downstream disk, and continues to counter-rotate in relation to said in the same direction upstream disk.

8. The apparatus according to claim 1 wherein said guide vanes are disposed at one or both ends of said hub.

9. The apparatus according to claim 1 wherein said guide vanes are substantially rectangular and comprise a curve such that said curve changes said water flow direction such that it strikes said hydrofoil blades at an acute angle to create lift and therefore rotation of said rotor disks.

10. The apparatus according to claim 1, wherein said vanes are fixed in place.

11. The apparatus according to claim 1, wherein said vanes are adjustable.

12. The apparatus according to claim 1 wherein said guide vanes are rotatably adjustable relative to said hub and said duct.

13. The apparatus according to claim 7 wherein when said water flow changes direction, said guide vanes rotate such that the curve of said guide vanes are reversed, thereby directing said water flow at a preferred angle.

14. The apparatus according to claim 7 wherein when said water flow changes direction, said curved guide vanes rotate such that said vanes directing said water flow on to said upstream rotor disk are reversed, thereby directing said water flow out of the new downstream rotor disk parallel to the axis of said hub, and said vanes disposed at the downstream end of said hub directing said water flow out of said turbine generator are now reversed to a position for directing said water flow at an acute angle onto said former downstream rotor disk.

15. The apparatus according to claim 12 wherein said vanes are rotated by means of a mechanical coupling to a skirt which flips from one end of said duct to the other as said water flow changes direction.

16. The apparatus according to claim 1 wherein said generator is a rim generator.

17. The apparatus according to claim 1 wherein said generator is comprised of magnets disposed at the tips of said blades and solenoids disposed in the interior wall of said duct.

18. The apparatus according to claim 1 wherein said generator is comprised of permanent magnets in a rim of said rotor disk and stator coils are disposed in the interior wall of said duct.

19. The apparatus according to claim 1 wherein said generator is one of a dual or single axial flux generator or a dual or single radial flux generator.

20. The apparatus according to claim 1 wherein said generator is flooded with ambient water.

21. The apparatus according to claim 1 wherein said rotor disks and generators are adapted to be removed as a modular unit, such that maintenance and replacement is easily facilitated.

22. The apparatus according to claim 1 further comprising a reversible skirt disposed about the midline of the outer surface of said duct and extending past one open end of said duct in the direction of said water flow.

23. The apparatus according to claim 22 wherein said skirt is adapted to lift and flip when said water flow reverses such that said skirt will always extend from said midline of said duct towards the downstream end of said hydro turbine.

24. The apparatus according to claim 22 wherein said skirt is comprised of a flexible material.

25. The apparatus of claim 22 wherein said skirt is comprised of articulated panels.

26. The apparatus according to claim 1 further comprising a screen disposed about the open ends of said duct such that debris and live creatures are deflected by said screen.

27. The apparatus according to claim 26 wherein said screen consists of metal bars.

28. The apparatus according to claim 26 wherein said bars extend forward from said duct ends to a point in front of the center of said duct ends.

29. The apparatus according to claim 26 wherein said screen consists of slats angled tangentially to said water flow such that debris and live creatures are deflected around said turbine.

30. An apparatus according to claim 1 wherein at least one turbine generator is mounted on at least one sub-marine telescoping pylon adapted to selectively lower or raise said turbine generator above a water surface and to selected submarine depths such that power generation is optimized.

31. The apparatus according to claim 1 wherein said hydro turbine generator is bi-directional and can accept said water flow from either of two open ends and generate power.

32. The apparatus according to claim 1 wherein said duct has a converging inner surface such that a venturi effect is created.

33. The apparatus according to claim 4 wherein said rotor disks are coaxial and counter-rotating.

34. The apparatus according to claim 33 wherein there are 2 to 10 cascading pairs of coaxial counter-rotating turbine generators.

35. The apparatus according to claim 13 wherein said vanes are rotated by means of a mechanical coupling to a skirt which flips from one end of said duct to the other as said water flow direction changes.

36. The apparatus according to claim 14 wherein said vanes are rotated by means of a mechanical coupling to a skirt which flips from one end of said duct to the other as said water flow direction changes.

37. The apparatus according to claim 23 wherein said skirt is comprised of a flexible material.

38. The apparatus of claim 23 wherein said skirt is comprised of articulated panels.

39. The apparatus according to claim 1 further comprising a bypass hole defined by said hub such that said water flow passes longitudinally through said hub.

* * * * *